(12) United States Patent
Maheshwari et al.

(10) Patent No.: US 6,922,273 B1
(45) Date of Patent: Jul. 26, 2005

(54) PDL MITIGATION STRUCTURE FOR DIFFRACTIVE MEMS AND GRATINGS

(75) Inventors: Dinesh Maheshwari, Fremont, CA (US); Michael Dueweke, Santa Clara, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 200 days.

(21) Appl. No.: 10/377,840

(22) Filed: Feb. 28, 2003

(51) Int. Cl.[7] ................. G02B 26/00; G02B 26/08; G02B 5/18

(52) U.S. Cl. ............... 359/291; 359/290; 359/295; 359/298; 359/224; 359/572; 359/237

(58) Field of Search ................. 359/290, 291, 359/295, 298, 224, 318, 572, 573, 237

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |
| 2,415,226 A | 2/1947 | Sziklai |
| 2,783,406 A | 2/1957 | Vanderhooft |
| 2,920,529 A | 1/1960 | Blythe |
| 2,991,690 A | 7/1961 | Grey et al. |
| RE25,169 E | 5/1962 | Glenn |
| 3,256,465 A | 6/1966 | Weissenstern et al. |
| 3,388,301 A | 6/1968 | James |
| 3,443,871 A | 5/1969 | Chitayat |
| 3,553,364 A | 1/1971 | Lee |
| 3,576,394 A | 4/1971 | Lee |
| 3,600,798 A | 8/1971 | Lee |
| 3,656,837 A | 4/1972 | Sandbank |
| 3,657,610 A | 4/1972 | Yamamoto et al. |
| 3,693,239 A | 9/1972 | Dix |
| 3,743,507 A | 7/1973 | Ih et al. |
| 3,752,563 A | 8/1973 | Torok et al. |
| 3,781,465 A | 12/1973 | Ernstoff et al. |

(Continued)

FOREIGN PATENT DOCUMENTS

| | | | |
|---|---|---|---|
| DE | 32 33 195 A1 | 3/1983 | ............ H01L/23/52 |
| DE | 43 23 799 A1 | 1/1994 | ............ H01L/23/50 |
| DE | 197 23 618 A1 | 12/1997 | ............. G03F/1/14 |

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

(Continued)

*Primary Examiner*—Georgia Epps
*Assistant Examiner*—Jack Dinh
(74) *Attorney, Agent, or Firm*—Okamoto & Benedicto LLP

(57) ABSTRACT

A modulator for modulating an incident beam of light. The modulator includes a plurality of elements, each element including a first end, a second end, a first non-linear side, a second non-linear side, and a light reflective planar surface. The light reflective planar surfaces of the plurality of elements lie in one or more parallel planes. The elements are preferably arranged parallel to each other. The modulator also includes a support structure to maintain a position of each element relative to each other and to enable movement of selective ones of the plurality of elements in a direction normal to the one or more parallel planes of the plurality of elements. The plurality of elements are preferably moved between a first modulator configuration wherein the plurality of elements act to reflect the incident beam of light as a plane mirror, and a second modulator configuration wherein the plurality of elements act to diffract the incident beam of light. The non-linear sides substantially reduce the polarization dependent losses for diffraction from the plurality of elements.

20 Claims, 8 Drawing Sheets

U.S. PATENT DOCUMENTS

| | | |
|---|---|---|
| 3,783,184 A | 1/1974 | Ernstoff et al. |
| 3,792,916 A | 2/1974 | Sarna |
| 3,802,769 A | 4/1974 | Rotz et al. |
| 3,811,186 A | 5/1974 | Larnerd et al. |
| 3,861,784 A | 1/1975 | Torok |
| 3,862,360 A | 1/1975 | Dill et al. |
| 3,871,014 A | 3/1975 | King et al. |
| 3,886,310 A | 5/1975 | Guldberg et al. |
| 3,896,338 A | 7/1975 | Nathanson et al. |
| 3,915,548 A | 10/1975 | Opittek |
| 3,935,499 A | 1/1976 | Oess |
| 3,935,500 A | 1/1976 | Oess et al. |
| 3,938,881 A | 2/1976 | Biegelsen et al. |
| 3,941,456 A | 3/1976 | Schilz et al. |
| 3,942,245 A | 3/1976 | Jackson et al. |
| 3,943,281 A | 3/1976 | Keller et al. |
| 3,947,105 A | 3/1976 | Smith |
| 3,969,611 A | 7/1976 | Fonteneau |
| 3,980,476 A | 9/1976 | Wysocki |
| 3,991,416 A | 11/1976 | Byles et al. |
| 4,001,663 A | 1/1977 | Bray |
| 4,004,849 A | 1/1977 | Shattuck |
| 4,006,968 A | 2/1977 | Ernstoff et al. |
| 4,009,939 A | 3/1977 | Okano |
| 4,011,009 A | 3/1977 | Lama et al. |
| 4,012,116 A | 3/1977 | Yevick |
| 4,012,835 A | 3/1977 | Wallick |
| 4,017,158 A | 4/1977 | Booth |
| 4,020,381 A | 4/1977 | Oess et al. |
| 4,021,766 A | 5/1977 | Aine |
| 4,034,211 A | 7/1977 | Horst et al. |
| 4,034,399 A | 7/1977 | Drukier et al. |
| 4,035,068 A | 7/1977 | Rawson |
| 4,067,129 A | 1/1978 | Abramson et al. |
| 4,084,437 A | 4/1978 | Finnegan |
| 4,090,219 A | 5/1978 | Ernstoff et al. |
| 4,093,346 A | 6/1978 | Nishino et al. |
| 4,093,921 A | 6/1978 | Buss |
| 4,093,922 A | 6/1978 | Buss |
| 4,100,579 A | 7/1978 | Ernstoff |
| 4,103,273 A | 7/1978 | Keller |
| 4,126,380 A | 11/1978 | Borm |
| 4,127,322 A | 11/1978 | Jacobson et al. |
| 4,135,502 A | 1/1979 | Peck |
| 4,139,257 A | 2/1979 | Matsumoto |
| 4,143,943 A | 3/1979 | Rawson |
| 4,163,570 A | 8/1979 | Greenaway |
| 4,184,700 A | 1/1980 | Greenaway |
| 4,185,891 A | 1/1980 | Kaestner |
| 4,190,855 A | 2/1980 | Inoue |
| 4,195,915 A | 4/1980 | Lichty et al. |
| 4,205,428 A | 6/1980 | Ernstoff et al. |
| 4,211,918 A | 7/1980 | Nyfeler et al. |
| 4,223,050 A | 9/1980 | Nyfeler et al. |
| 4,225,913 A | 9/1980 | Bray |
| 4,249,796 A | 2/1981 | Sincerbox et al. |
| 4,250,217 A | 2/1981 | Greenaway |
| 4,250,393 A | 2/1981 | Greenaway |
| 4,256,787 A | 3/1981 | Shaver et al. |
| 4,257,016 A | 3/1981 | Kramer, Jr. et al. |
| 4,290,672 A | 9/1981 | Whitefield |
| 4,295,145 A | 10/1981 | Latta |
| 4,311,999 A | 1/1982 | Upton et al. |
| 4,327,411 A | 4/1982 | Turner |
| 4,327,966 A | 5/1982 | Bloom |
| 4,331,972 A | 5/1982 | Rajchman |
| 4,336,982 A | 6/1982 | Rector, Jr. |
| 4,338,660 A | 7/1982 | Kelley et al. |
| 4,343,535 A | 8/1982 | Bleha, Jr. |
| 4,346,965 A | 8/1982 | Sprague et al. |
| 4,348,079 A | 9/1982 | Johnson |
| 4,355,463 A | 10/1982 | Burns |
| 4,361,384 A | 11/1982 | Bosserman |
| 4,369,524 A | 1/1983 | Rawson et al. |
| 4,374,397 A | 2/1983 | Mir |
| 4,389,096 A | 6/1983 | Hori et al. |
| 4,391,490 A | 7/1983 | Hartke |
| 4,396,246 A | 8/1983 | Holman |
| 4,398,798 A | 8/1983 | Krawczak et al. |
| 4,400,740 A | 8/1983 | Traino et al. |
| 4,408,884 A | 10/1983 | Kleinknecht et al. |
| 4,414,583 A | 11/1983 | Hooker, III |
| 4,417,386 A | 11/1983 | Exner |
| 4,418,397 A | 11/1983 | Brantingham et al. |
| 4,420,717 A | 12/1983 | Wallace et al. |
| 4,422,099 A | 12/1983 | Wolfe |
| 4,426,768 A | 1/1984 | Black et al. |
| 4,430,584 A | 2/1984 | Someshwar et al. |
| 4,435,041 A | 3/1984 | Torok et al. |
| 4,440,839 A | 4/1984 | Mottier |
| 4,443,819 A | 4/1984 | Funada et al. |
| 4,443,845 A | 4/1984 | Hamilton et al. |
| 4,447,881 A | 5/1984 | Brantingham et al. |
| 4,454,591 A | 6/1984 | Lou |
| 4,456,338 A | 6/1984 | Gelbart |
| 4,460,907 A | 7/1984 | Nelson |
| 4,462,046 A | 7/1984 | Spight |
| 4,467,342 A | 8/1984 | Tower |
| 4,468,725 A | 8/1984 | Venturini |
| 4,483,596 A | 11/1984 | Marshall |
| 4,484,188 A | 11/1984 | Ott |
| 4,487,677 A | 12/1984 | Murphy |
| 4,492,435 A | 1/1985 | Banton et al. |
| 4,503,494 A | 3/1985 | Hamilton et al. |
| 4,511,220 A | 4/1985 | Scully |
| 4,538,883 A | 9/1985 | Sprague et al. |
| 4,545,610 A | 10/1985 | Lakritz et al. |
| 4,556,378 A | 12/1985 | Nyfeler et al. |
| 4,558,171 A | 12/1985 | Gantley et al. |
| 4,561,011 A | 12/1985 | Kohara et al. |
| 4,561,044 A | 12/1985 | Ogura et al. |
| 4,566,935 A | 1/1986 | Hornbeck |
| 4,567,585 A | 1/1986 | Gelbart |
| 4,571,041 A | 2/1986 | Gaudyn |
| 4,571,603 A | 2/1986 | Hornbeck et al. |
| 4,577,932 A | 3/1986 | Gelbart |
| 4,577,933 A | 3/1986 | Yip et al. |
| 4,588,957 A | 5/1986 | Balant et al. |
| 4,590,548 A | 5/1986 | Maytum |
| 4,594,501 A | 6/1986 | Culley et al. |
| 4,596,992 A | 6/1986 | Hornbeck |
| 4,615,595 A | 10/1986 | Hornbeck |
| 4,623,219 A | 11/1986 | Trias |
| 4,636,039 A | 1/1987 | Turner |
| 4,636,866 A | 1/1987 | Hattori |
| 4,641,193 A | 2/1987 | Glenn |
| 4,645,881 A | 2/1987 | LeToumelin et al. |
| 4,646,158 A | 2/1987 | Ohno et al. |
| 4,649,085 A | 3/1987 | Landram |
| 4,649,432 A | 3/1987 | Watanabe |
| 4,652,932 A | 3/1987 | Miyajima et al. |
| 4,655,539 A | 4/1987 | Caulfield et al. |
| 4,660,938 A | 4/1987 | Kazan |
| 4,661,828 A | 4/1987 | Miller, Jr. et al. |
| 4,662,746 A | 5/1987 | Hornbeck |
| 4,663,670 A | 5/1987 | Ito et al. |
| 4,687,326 A | 8/1987 | Corby, Jr. |
| 4,698,602 A | 10/1987 | Armitage |
| 4,700,276 A | 10/1987 | Freyman et al. |
| 4,707,064 A | 11/1987 | Dobrowolski et al. |
| 4,709,995 A | 12/1987 | Kuribayashi et al. |

| | | | | | |
|---|---|---|---|---|---|
| 4,710,732 A | 12/1987 | Hornbeck | 5,023,905 A | 6/1991 | Wells et al. |
| 4,711,526 A | 12/1987 | Hennings et al. | 5,024,494 A | 6/1991 | Williams et al. |
| 4,714,326 A | 12/1987 | Usui et al. | 5,028,939 A | 7/1991 | Hornbeck et al. |
| 4,717,066 A | 1/1988 | Goldenberg et al. | 5,031,144 A | 7/1991 | Persky |
| 4,719,507 A | 1/1988 | Bos | 5,035,473 A | 7/1991 | Kuwayama et al. |
| 4,721,629 A | 1/1988 | Sakai et al. | 5,037,173 A | 8/1991 | Sampsell et al. |
| 4,722,593 A | 2/1988 | Shimazaki | 5,039,628 A | 8/1991 | Carey |
| 4,724,467 A | 2/1988 | Yip et al. | 5,040,052 A | 8/1991 | McDavid |
| 4,728,185 A | 3/1988 | Thomas | 5,041,395 A | 8/1991 | Steffen |
| 4,743,091 A | 5/1988 | Gelbart | 5,041,851 A | 8/1991 | Nelson |
| 4,744,633 A | 5/1988 | Sheiman | 5,043,917 A | 8/1991 | Okamoto |
| 4,747,671 A | 5/1988 | Takahashi et al. | 5,048,077 A | 9/1991 | Wells et al. |
| 4,751,509 A | 6/1988 | Kubota et al. | 5,049,901 A | 9/1991 | Gelbart |
| 4,761,253 A | 8/1988 | Antes | 5,058,992 A | 10/1991 | Takahashi |
| 4,763,975 A | 8/1988 | Scifres et al. | 5,060,058 A | 10/1991 | Goldenberg et al. |
| 4,765,865 A | 8/1988 | Gealer et al. | 5,061,049 A | 10/1991 | Hornbeck |
| 4,772,094 A | 9/1988 | Sheiman | 5,066,614 A | 11/1991 | Dunnaway et al. |
| 4,797,694 A | 1/1989 | Agostinelli et al. | 5,068,205 A | 11/1991 | Baxter et al. |
| 4,797,918 A | 1/1989 | Lee et al. | 5,072,239 A | 12/1991 | Mitcham et al. |
| 4,801,194 A | 1/1989 | Agostinelli et al. | 5,072,418 A | 12/1991 | Boutaud et al. |
| 4,803,560 A | 2/1989 | Matsunaga et al. | 5,074,947 A | 12/1991 | Estes et al. |
| 4,804,641 A | 2/1989 | Arlt et al. | 5,075,940 A | 12/1991 | Kuriyama et al. |
| 4,807,021 A | 2/1989 | Okumura | 5,079,544 A | 1/1992 | DeMond et al. |
| 4,807,965 A | 2/1989 | Garakani | 5,081,617 A | 1/1992 | Gelbart |
| 4,809,078 A | 2/1989 | Yabe et al. | 5,083,857 A | 1/1992 | Hornbeck |
| 4,811,082 A | 3/1989 | Jacobs et al. | 5,085,497 A | 2/1992 | Um et al. |
| 4,811,210 A | 3/1989 | McAulay | 5,089,903 A | 2/1992 | Kuwayama et al. |
| 4,814,759 A | 3/1989 | Gombrich et al. | 5,093,281 A | 3/1992 | Eshima |
| 4,817,850 A | 4/1989 | Wiener-Avnear et al. | 5,096,279 A | 3/1992 | Hornbeck et al. |
| 4,824,200 A | 4/1989 | Isono et al. | 5,099,353 A | 3/1992 | Hornbeck |
| 4,827,391 A | 5/1989 | Sills | 5,101,184 A | 3/1992 | Antes |
| 4,829,365 A | 5/1989 | Eichenlaub | 5,101,236 A | 3/1992 | Nelson et al. |
| 4,836,649 A | 6/1989 | Ledebuhr et al. | 5,103,334 A | 4/1992 | Swanberg |
| 4,856,863 A | 8/1989 | Sampsell et al. | 5,105,207 A | 4/1992 | Nelson |
| 4,856,869 A | 8/1989 | Sakata et al. | 5,105,299 A | 4/1992 | Anderson et al. |
| 4,859,012 A | 8/1989 | Cohn | 5,105,369 A | 4/1992 | Nelson |
| 4,859,060 A | 8/1989 | Katagiri et al. | 5,107,372 A | 4/1992 | Gelbart et al. |
| 4,866,488 A | 9/1989 | Frensley | 5,112,436 A | 5/1992 | Bol |
| 4,882,683 A | 11/1989 | Rupp et al. | 5,113,272 A | 5/1992 | Reamey |
| 4,893,509 A | 1/1990 | MacIver et al. | 5,113,285 A | 5/1992 | Franklin et al. |
| 4,896,325 A | 1/1990 | Coldren | 5,115,344 A | 5/1992 | Jaskie |
| 4,896,948 A | 1/1990 | Dono et al. | 5,119,204 A | 6/1992 | Hashimoto et al. |
| 4,897,708 A | 1/1990 | Clements | 5,121,343 A | 6/1992 | Faris |
| 4,902,083 A | 2/1990 | Wells | 5,126,812 A | 6/1992 | Greiff |
| 4,915,463 A | 4/1990 | Barbee, Jr. | 5,126,826 A | 6/1992 | Kauchi et al. |
| 4,915,479 A | 4/1990 | Clarke | 5,126,836 A | 6/1992 | Um |
| 4,924,413 A | 5/1990 | Suwannukul | 5,128,660 A | 7/1992 | DeMond et al. |
| 4,926,241 A | 5/1990 | Carey | 5,129,716 A | 7/1992 | Holakovszky et al. |
| 4,930,043 A | 5/1990 | Wiegand | 5,132,723 A | 7/1992 | Gelbart |
| 4,934,773 A | 6/1990 | Becker | 5,132,812 A | 7/1992 | Takahashi et al. |
| 4,940,309 A | 7/1990 | Baum | 5,136,695 A | 8/1992 | Goldshlag et al. |
| 4,943,815 A | 7/1990 | Aldrich et al. | 5,137,836 A | 8/1992 | Lam |
| 4,945,773 A | 8/1990 | Sickafus | 5,142,303 A | 8/1992 | Nelson |
| 4,949,148 A | 8/1990 | Bartelink | 5,142,405 A | 8/1992 | Hornbeck |
| 4,950,890 A | 8/1990 | Gelbart | 5,142,677 A | 8/1992 | Ehlig et al. |
| 4,952,925 A | 8/1990 | Haastert | 5,144,472 A | 9/1992 | Sang, Jr. et al. |
| 4,954,789 A | 9/1990 | Sampsell | 5,147,815 A | 9/1992 | Casto |
| 4,956,619 A | 9/1990 | Hornbeck | 5,148,157 A | 9/1992 | Florence |
| 4,961,633 A | 10/1990 | Ibrahim et al. | 5,148,506 A | 9/1992 | McDonald |
| 4,963,012 A | 10/1990 | Tracy et al. | 5,149,405 A | 9/1992 | Bruns et al. |
| 4,970,575 A | 11/1990 | Soga et al. | 5,150,205 A | 9/1992 | Um et al. |
| 4,978,202 A | 12/1990 | Yang | 5,151,718 A | 9/1992 | Nelson |
| 4,982,184 A | 1/1991 | Kirkwood | 5,151,724 A | 9/1992 | Kikinis |
| 4,982,265 A | 1/1991 | Watanabe et al. | 5,151,763 A | 9/1992 | Marek et al. |
| 4,984,824 A | 1/1991 | Antes et al. | 5,153,770 A | 10/1992 | Harris |
| 4,999,308 A | 3/1991 | Nishiura et al. | 5,155,604 A | 10/1992 | Miekka et al. |
| 5,003,300 A | 3/1991 | Wells | 5,155,615 A | 10/1992 | Tagawa |
| 5,009,473 A | 4/1991 | Hunter et al. | 5,155,778 A | 10/1992 | Magel et al. |
| 5,013,141 A | 5/1991 | Sakata | 5,155,812 A | 10/1992 | Ehlig et al. |
| 5,018,256 A | 5/1991 | Hornbeck | 5,157,304 A | 10/1992 | Kane et al. |
| 5,022,750 A | 6/1991 | Flasck | 5,159,485 A | 10/1992 | Nelson |

| | | | | | |
|---|---|---|---|---|---|
| 5,161,042 A | 11/1992 | Hamada | 5,256,869 A | 10/1993 | Lin et al. |
| 5,162,787 A | 11/1992 | Thompson et al. | 5,258,325 A | 11/1993 | Spitzer et al. |
| 5,164,019 A | 11/1992 | Sinton | 5,260,718 A | 11/1993 | Rommelmann et al. |
| 5,165,013 A | 11/1992 | Faris | 5,260,798 A | 11/1993 | Um et al. |
| 5,168,401 A | 12/1992 | Endriz | 5,262,000 A | 11/1993 | Welbourn et al. |
| 5,168,406 A | 12/1992 | Nelson | 5,272,473 A | 12/1993 | Thompson et al. |
| 5,170,156 A | 12/1992 | DeMond et al. | 5,278,652 A | 1/1994 | Urbanus et al. |
| 5,170,269 A | 12/1992 | Lin et al. | 5,278,925 A | 1/1994 | Boysel et al. |
| 5,170,283 A | 12/1992 | O'Brien et al. | 5,280,277 A | 1/1994 | Hornbeck |
| 5,172,161 A | 12/1992 | Nelson | 5,281,887 A | 1/1994 | Engle |
| 5,172,262 A | 12/1992 | Hornbeck | 5,281,957 A | 1/1994 | Schoolman |
| 5,177,724 A | 1/1993 | Gelbart | 5,285,105 A | 2/1994 | Cain |
| 5,178,728 A | 1/1993 | Boysel et al. | 5,285,196 A | 2/1994 | Gale, Jr. |
| 5,179,274 A | 1/1993 | Sampsell | 5,285,407 A | 2/1994 | Gale et al. |
| 5,179,367 A | 1/1993 | Shimizu | 5,287,096 A | 2/1994 | Thompson et al. |
| 5,181,231 A | 1/1993 | Parikh et al. | 5,287,215 A | 2/1994 | Warde et al. |
| 5,182,665 A | 1/1993 | O'Callaghan et al. | 5,289,172 A | 2/1994 | Gale, Jr. et al. |
| 5,185,660 A | 2/1993 | Um | 5,291,317 A | 3/1994 | Newswanger |
| 5,185,823 A | 2/1993 | Kaku et al. | 5,291,473 A | 3/1994 | Pauli |
| 5,188,280 A | 2/1993 | Nakao et al. | 5,293,511 A | 3/1994 | Poradish et al. |
| 5,189,404 A | 2/1993 | Masimo et al. | 5,296,408 A | 3/1994 | Wilbarg et al. |
| 5,189,505 A | 2/1993 | Bartelink | 5,296,891 A | 3/1994 | Vogt et al. |
| 5,191,405 A | 3/1993 | Tomita et al. | 5,296,950 A | 3/1994 | Lin et al. |
| 5,192,864 A | 3/1993 | McEwen et al. | 5,298,460 A | 3/1994 | Nishiguchi et al. |
| 5,192,946 A | 3/1993 | Thompson et al. | 5,299,037 A | 3/1994 | Sakata |
| 5,198,895 A | 3/1993 | Vick | 5,299,289 A | 3/1994 | Omae et al. |
| D334,557 S | 4/1993 | Hunter et al. ............... D14/114 | 5,300,813 A | 4/1994 | Joshi et al. |
| D334,742 S | 4/1993 | Hunter et al. ............... D14/113 | 5,301,062 A | 4/1994 | Takahashi et al. |
| 5,202,785 A | 4/1993 | Nelson | 5,303,043 A | 4/1994 | Glenn |
| 5,206,629 A | 4/1993 | DeMond et al. | 5,303,055 A | 4/1994 | Hendrix et al. |
| 5,206,829 A | 4/1993 | Thakoor et al. | 5,307,056 A | 4/1994 | Urbanus |
| 5,208,818 A | 5/1993 | Gelbart et al. | 5,307,185 A | 4/1994 | Jones et al. |
| 5,208,891 A | 5/1993 | Prysner | 5,310,624 A | 5/1994 | Ehrlich |
| 5,210,637 A | 5/1993 | Puzey | 5,311,349 A | 5/1994 | Anderson et al. |
| 5,212,115 A | 5/1993 | Cho et al. | 5,311,360 A | 5/1994 | Bloom et al. |
| 5,212,555 A | 5/1993 | Stoltz | 5,312,513 A | 5/1994 | Florence et al. |
| 5,212,582 A | 5/1993 | Nelson | 5,313,479 A | 5/1994 | Florence |
| 5,214,308 A | 5/1993 | Nishiguchi et al. | 5,313,648 A | 5/1994 | Ehlig et al. |
| 5,214,419 A | 5/1993 | DeMond et al. | 5,313,835 A | 5/1994 | Dunn |
| 5,214,420 A | 5/1993 | Thompson et al. | 5,315,418 A | 5/1994 | Sprague et al. |
| 5,216,278 A | 6/1993 | Lin et al. | 5,315,423 A | 5/1994 | Hong |
| 5,216,537 A | 6/1993 | Hornbeck | 5,315,429 A | 5/1994 | Abramov |
| 5,216,544 A | 6/1993 | Horikawa et al. | 5,319,214 A | 6/1994 | Gregory et al. |
| 5,219,794 A | 6/1993 | Satoh et al. | 5,319,668 A | 6/1994 | Luecke |
| 5,220,200 A | 6/1993 | Blanton | 5,319,789 A | 6/1994 | Ehlig et al. |
| 5,221,400 A | 6/1993 | Staller et al. | 5,319,792 A | 6/1994 | Ehlig et al. |
| 5,221,982 A | 6/1993 | Faris | 5,320,709 A | 6/1994 | Bowden et al. |
| 5,224,088 A | 6/1993 | Atiya | 5,321,416 A | 6/1994 | Bassett et al. |
| D337,320 S | 7/1993 | Hunter et al. ............... D14/113 | 5,323,002 A | 6/1994 | Sampsell et al. |
| 5,226,099 A | 7/1993 | Mignardi et al. | 5,323,051 A | 6/1994 | Adams et al. |
| 5,229,597 A | 7/1993 | Fukatsu | 5,325,116 A | 6/1994 | Sampsell |
| 5,230,005 A | 7/1993 | Rubino et al. | 5,327,286 A | 7/1994 | Sampsell et al. |
| 5,231,363 A | 7/1993 | Sano et al. | 5,329,289 A | 7/1994 | Sakamoto et al. |
| 5,231,388 A | 7/1993 | Stoltz | 5,330,301 A | 7/1994 | Brancher |
| 5,231,432 A | 7/1993 | Glenn | 5,330,878 A | 7/1994 | Nelson |
| 5,233,456 A | 8/1993 | Nelson | 5,331,454 A | 7/1994 | Hornbeck |
| 5,233,460 A | 8/1993 | Partlo et al. | 5,334,991 A | 8/1994 | Wells et al. |
| 5,233,874 A | 8/1993 | Putty et al. | 5,339,116 A | 8/1994 | Urbanus et al. |
| 5,237,340 A | 8/1993 | Nelson | 5,339,177 A | 8/1994 | Jenkins et al. |
| 5,237,435 A | 8/1993 | Kurematsu et al. | 5,340,772 A | 8/1994 | Rosotker |
| 5,239,448 A | 8/1993 | Perkins et al. | 5,345,521 A | 9/1994 | McDonald et al. |
| 5,239,806 A | 8/1993 | Maslakow | 5,347,321 A | 9/1994 | Gove |
| 5,240,818 A | 8/1993 | Mignardi et al. | 5,347,378 A | 9/1994 | Handschy et al. |
| 5,245,686 A | 9/1993 | Faris et al. | 5,347,433 A | 9/1994 | Sedlmayr |
| 5,247,180 A | 9/1993 | Mitcham et al. | 5,348,619 A | 9/1994 | Bohannon et al. |
| 5,247,593 A | 9/1993 | Lin et al. | 5,349,687 A | 9/1994 | Ehlig et al. |
| 5,249,245 A | 9/1993 | Lebby et al. | 5,351,052 A | 9/1994 | D'Hont et al. |
| 5,251,057 A | 10/1993 | Guerin et al. | 5,352,926 A | 10/1994 | Andrews |
| 5,251,058 A | 10/1993 | MacArthur | 5,354,416 A | 10/1994 | Okudaira |
| 5,254,980 A | 10/1993 | Hendrix et al. | 5,357,369 A | 10/1994 | Pilling et al. |
| 5,255,100 A | 10/1993 | Urbanus | 5,357,803 A | 10/1994 | Lane |

| | | | | | | |
|---|---|---|---|---|---|---|
| 5,359,349 A | 10/1994 | Jambor et al. | | 5,467,106 A | 11/1995 | Salomon |
| 5,359,451 A | 10/1994 | Gelbart et al. | | 5,467,138 A | 11/1995 | Gove |
| 5,361,131 A | 11/1994 | Tekemori et al. | | 5,467,146 A | 11/1995 | Huang et al. |
| 5,363,220 A | 11/1994 | Kuwayama et al. | | 5,469,302 A | 11/1995 | Lim |
| 5,365,283 A | 11/1994 | Doherty et al. | | 5,471,341 A | 11/1995 | Warde et al. |
| 5,367,585 A | 11/1994 | Ghezzo et al. | | 5,473,512 A | 12/1995 | Degani et al. |
| 5,370,742 A | 12/1994 | Mitchell et al. | | 5,475,236 A | 12/1995 | Yoshizaki |
| 5,371,543 A | 12/1994 | Anderson | | 5,480,839 A | 1/1996 | Ezawa et al. |
| 5,371,618 A | 12/1994 | Tai et al. | | 5,481,118 A | 1/1996 | Tew |
| 5,377,705 A | 1/1995 | Smith, Jr. et al. | | 5,481,133 A | 1/1996 | Hsu |
| 5,382,961 A | 1/1995 | Gale, Jr. | | 5,482,564 A | 1/1996 | Douglas et al. |
| 5,387,924 A | 2/1995 | Gale, Jr. et al. | | 5,482,818 A | 1/1996 | Nelson |
| 5,389,182 A | 2/1995 | Mignardi | | 5,483,307 A | 1/1996 | Anderson |
| 5,391,881 A | 2/1995 | Jeuch et al. | | 5,485,172 A | 1/1996 | Sawachika et al. |
| 5,392,140 A | 2/1995 | Ezra et al. | | 5,485,304 A | 1/1996 | Kaeriyama |
| 5,392,151 A | 2/1995 | Nelson | | 5,485,354 A | 1/1996 | Ciupke et al. |
| 5,394,303 A | 2/1995 | Yamaji | | 5,486,698 A | 1/1996 | Hanson et al. |
| 5,398,071 A | 3/1995 | Gove et al. | | 5,486,841 A | 1/1996 | Hara et al. |
| 5,399,898 A | 3/1995 | Rostoker | | 5,486,946 A | 1/1996 | Jachimowicz et al. |
| 5,404,365 A | 4/1995 | Hiiro | | 5,488,431 A | 1/1996 | Gove et al. |
| 5,404,485 A | 4/1995 | Ban | | 5,489,952 A | 2/1996 | Gove et al. |
| 5,408,123 A | 4/1995 | Murai | | 5,490,009 A | 2/1996 | Venkateswar et al. |
| 5,410,315 A | 4/1995 | Huber | | 5,491,510 A | 2/1996 | Gove |
| 5,411,769 A | 5/1995 | Hornbeck | | 5,491,612 A | 2/1996 | Nicewarner, Jr. |
| 5,412,186 A | 5/1995 | Gale | | 5,491,715 A | 2/1996 | Flaxl |
| 5,412,501 A | 5/1995 | Fisli | | 5,493,177 A | 2/1996 | Muller et al. |
| 5,418,584 A | 5/1995 | Larson | | 5,493,439 A | 2/1996 | Engle |
| 5,420,655 A | 5/1995 | Shimizu | | 5,497,172 A | 3/1996 | Doherty et al. |
| 5,420,722 A | 5/1995 | Bielak | | 5,497,197 A | 3/1996 | Gove et al. |
| 5,426,072 A | 6/1995 | Finnila | | 5,497,262 A | 3/1996 | Kaeriyama |
| 5,427,975 A | 6/1995 | Sparks et al. | | 5,499,060 A | 3/1996 | Gove et al. |
| 5,430,524 A | 7/1995 | Nelson | | 5,499,062 A | 3/1996 | Urbanus |
| 5,435,876 A | 7/1995 | Alfaro et al. | | 5,500,761 A | 3/1996 | Goossen et al. |
| 5,438,477 A | 8/1995 | Pasch | | 5,502,481 A | 3/1996 | Dentinger et al. |
| 5,439,731 A | 8/1995 | Li et al. | | 5,504,504 A | 4/1996 | Markandey et al. |
| 5,442,411 A | 8/1995 | Urbanus et al. | | 5,504,514 A | 4/1996 | Nelson |
| 5,442,414 A | 8/1995 | Janssen et al. | | 5,504,575 A | 4/1996 | Stafford |
| 5,444,566 A | 8/1995 | Gale et al. | | 5,504,614 A | 4/1996 | Webb et al. |
| 5,445,559 A | 8/1995 | Gale et al. | | 5,506,171 A | 4/1996 | Leonard et al. |
| 5,446,479 A | 8/1995 | Thompson et al. | | 5,506,597 A | 4/1996 | Thompson et al. |
| 5,447,600 A | 9/1995 | Webb | | 5,506,720 A | 4/1996 | Yoon |
| 5,448,314 A | 9/1995 | Heimbuch et al. | | 5,508,558 A | 4/1996 | Robinette, Jr. et al. |
| 5,448,546 A | 9/1995 | Pauli | | 5,508,561 A | 4/1996 | Tago et al. |
| 5,450,088 A | 9/1995 | Meier et al. | | 5,508,565 A | 4/1996 | Hatakeyama et al. |
| 5,450,219 A | 9/1995 | Gold et al. | | 5,508,750 A | 4/1996 | Hewlett et al. |
| 5,451,103 A | 9/1995 | Hatanaka et al. | | 5,508,840 A | 4/1996 | Vogel et al. |
| 5,452,024 A | 9/1995 | Sampsell | | 5,508,841 A | 4/1996 | Lin et al. |
| 5,452,138 A | 9/1995 | Mignardi et al. | | 5,510,758 A | 4/1996 | Fujita et al. |
| 5,453,747 A | 9/1995 | D'Hont et al. | | 5,510,824 A | 4/1996 | Nelson |
| 5,453,778 A | 9/1995 | Venkateswar et al. | | 5,512,374 A | 4/1996 | Nelson |
| 5,453,803 A | 9/1995 | Shapiro et al. | | 5,512,748 A | 4/1996 | Hanson |
| 5,454,160 A | 10/1995 | Nickel | | 5,515,076 A | 5/1996 | Thompson et al. |
| 5,454,906 A | 10/1995 | Baker et al. | | 5,516,125 A | 5/1996 | McKenna |
| 5,455,445 A | 10/1995 | Kurtz et al. | | 5,517,340 A | 5/1996 | Doany et al. |
| 5,455,455 A | 10/1995 | Badehi | | 5,517,347 A | 5/1996 | Sampsell |
| 5,455,602 A | 10/1995 | Tew | | 5,517,357 A | 5/1996 | Shibayama |
| 5,457,493 A | 10/1995 | Leddy et al. | | 5,517,359 A | 5/1996 | Gelbart |
| 5,457,566 A | 10/1995 | Sampsell et al. | | 5,519,251 A | 5/1996 | Sato et al. |
| 5,457,567 A | 10/1995 | Shinohara | | 5,519,450 A | 5/1996 | Urbanus et al. |
| 5,458,716 A | 10/1995 | Alfaro et al. | | 5,521,748 A | 5/1996 | Sarraf |
| 5,459,492 A | 10/1995 | Venkateswar | | 5,523,619 A | 6/1996 | McAllister et al. |
| 5,459,528 A | 10/1995 | Pettitt | | 5,523,628 A | 6/1996 | Williams et al. |
| 5,459,592 A | 10/1995 | Shibatani et al. | | 5,523,803 A | 6/1996 | Urbanus et al. |
| 5,459,610 A | 10/1995 | Bloom et al. | | 5,523,878 A | 6/1996 | Wallace et al. |
| 5,461,197 A | 10/1995 | Hiruta et al. | | 5,523,881 A | 6/1996 | Florence et al. |
| 5,461,410 A | 10/1995 | Venkateswar et al. | | 5,523,920 A | 6/1996 | Machuga et al. |
| 5,461,411 A | 10/1995 | Florence et al. | | 5,524,155 A | 6/1996 | Weaver |
| 5,461,547 A | 10/1995 | Ciupke et al. | | 5,526,834 A | 6/1996 | Mielnik et al. |
| 5,463,347 A | 10/1995 | Jones et al. | | 5,534,107 A | 7/1996 | Gray et al. |
| 5,463,497 A | 10/1995 | Muraki et al. | | 5,534,883 A | 7/1996 | Koh |
| 5,465,175 A | 11/1995 | Woodgate et al. | | 5,539,422 A | 7/1996 | Heacock et al. |

| | | | | | |
|---|---|---|---|---|---|
| 5,544,306 A | 8/1996 | Deering et al. | 5,920,411 A | 7/1999 | Duck et al. |
| 5,552,635 A | 9/1996 | Kim et al. | 5,920,418 A | 7/1999 | Shiono et al. |
| 5,554,304 A | 9/1996 | Suzuki | 5,923,475 A | 7/1999 | Kurtz et al. |
| 5,576,878 A | 11/1996 | Henck | 5,926,309 A | 7/1999 | Little |
| 5,602,671 A | 2/1997 | Hornbeck | 5,926,318 A | 7/1999 | Hebert |
| 5,606,181 A | 2/1997 | Sakuma et al. | 5,942,791 A | 8/1999 | Shorrocks et al. |
| 5,606,447 A | 2/1997 | Asada et al. | 5,949,390 A | 9/1999 | Nomura et al. |
| 5,610,438 A | 3/1997 | Wallace et al. | 5,949,570 A | 9/1999 | Shiono et al. |
| 5,623,361 A | 4/1997 | Engle | 5,953,161 A | 9/1999 | Troxell et al. |
| 5,629,566 A | 5/1997 | Doi et al. | 5,955,771 A | 9/1999 | Kurtz et al. |
| 5,629,801 A | 5/1997 | Staker et al. | 5,963,788 A | 10/1999 | Barron et al. |
| 5,640,216 A | 6/1997 | Hasegawa et al. | 5,978,127 A | 11/1999 | Berg |
| 5,658,698 A | 8/1997 | Yagi et al. | 5,982,553 A | 11/1999 | Bloom et al. |
| 5,661,592 A | 8/1997 | Bornstein et al. ............ 359/291 | 5,986,634 A | 11/1999 | Alioshin |
| 5,661,593 A | 8/1997 | Engle | 5,986,796 A | 11/1999 | Miles |
| 5,663,817 A | 9/1997 | Frapin et al. | 5,995,303 A | 11/1999 | Honguh et al. |
| 5,668,611 A | 9/1997 | Ernstoff et al. | 5,999,319 A | 12/1999 | Castracane |
| 5,673,139 A | 9/1997 | Johnson | 6,004,912 A | 12/1999 | Gudeman |
| 5,677,783 A | 10/1997 | Bloom et al. | 6,012,336 A | 1/2000 | Eaton et al. |
| 5,689,361 A | 11/1997 | Damen et al. | 6,016,222 A | 1/2000 | Setani et al. |
| 5,691,836 A | 11/1997 | Clark | 6,025,859 A | 2/2000 | Ide et al. |
| 5,694,740 A | 12/1997 | Martin et al. | 6,038,057 A | 3/2000 | Brazas, Jr. et al. |
| 5,696,560 A | 12/1997 | Songer | 6,040,748 A | 3/2000 | Gueissaz |
| 5,699,740 A | 12/1997 | Gelbart | 6,046,840 A | 4/2000 | Huibers |
| 5,704,700 A | 1/1998 | Kappel et al. | 6,055,090 A | 4/2000 | Miles |
| 5,707,160 A | 1/1998 | Bowen | 6,057,520 A | 5/2000 | Goodwin-Johansson |
| 5,712,649 A | 1/1998 | Tosaki | 6,061,166 A | 5/2000 | Furlani et al. |
| 5,713,652 A | 2/1998 | Zavracky et al. | 6,061,489 A | 5/2000 | Ezra |
| 5,726,480 A | 3/1998 | Pister | 6,062,461 A | 5/2000 | Sparks et al. |
| 5,731,802 A | 3/1998 | Aras et al. | 6,064,404 A | 5/2000 | Aras et al. |
| 5,734,224 A | 3/1998 | Tagawa et al. | 6,069,392 A | 5/2000 | Tai et al. |
| 5,742,373 A | 4/1998 | Alvelda | 6,071,652 A | 6/2000 | Feldman et al. ................ 430/5 |
| 5,744,752 A | 4/1998 | McHerron et al. | 6,075,632 A | 6/2000 | Braun |
| 5,745,271 A | 4/1998 | Ford et al. | 6,084,626 A | 7/2000 | Ramanujan et al. |
| 5,757,354 A | 5/1998 | Kawamura | 6,088,102 A | 7/2000 | Manhart |
| 5,757,536 A | 5/1998 | Ricco et al. | 6,090,717 A | 7/2000 | Powell et al. |
| 5,764,280 A | 6/1998 | Bloom et al. | 6,091,521 A | 7/2000 | Popovich |
| 5,768,009 A | 6/1998 | Little | 6,096,576 A | 8/2000 | Corbin et al. |
| 5,773,473 A | 6/1998 | Green et al. | 6,096,656 A | 8/2000 | Matzke et al. |
| 5,793,519 A | 8/1998 | Furlani et al. | 6,097,352 A | 8/2000 | Zavracky et al. |
| 5,798,743 A | 8/1998 | Bloom | 6,101,036 A | 8/2000 | Bloom |
| 5,798,805 A | 8/1998 | Ooi et al. | 6,115,168 A | 9/2000 | Zhao et al. |
| 5,801,074 A | 9/1998 | Kim et al. | 6,122,299 A | 9/2000 | DeMars et al. |
| 5,802,222 A | 9/1998 | Rasch et al. | 6,123,985 A | 9/2000 | Robinson et al. |
| 5,808,323 A | 9/1998 | Spaeth et al. | 6,124,145 A | 9/2000 | Stemme et al. |
| 5,808,797 A | 9/1998 | Bloom et al. | 6,130,770 A | 10/2000 | Bloom |
| 5,815,126 A | 9/1998 | Fan et al. | 6,144,481 A | 11/2000 | Kowarz et al. |
| 5,825,443 A | 10/1998 | Kawasaki et al. | 6,147,789 A | 11/2000 | Gelbart |
| 5,832,148 A | 11/1998 | Yariv | 6,154,259 A | 11/2000 | Hargis et al. |
| 5,835,255 A | 11/1998 | Miles | 6,154,305 A | 11/2000 | Dickensheets et al. |
| 5,835,256 A | 11/1998 | Huibers | 6,163,026 A | 12/2000 | Bawolek et al. |
| 5,837,562 A | 11/1998 | Cho | 6,163,402 A | 12/2000 | Chou et al. |
| 5,841,579 A | 11/1998 | Cho | 6,169,624 B1 | 1/2001 | Godil et al. |
| 5,841,929 A | 11/1998 | Komatsu et al. | 6,172,796 B1 | 1/2001 | Kowarz et al. ............. 359/290 |
| 5,844,711 A | 12/1998 | Long, Jr. | 6,172,797 B1 | 1/2001 | Huibers |
| 5,847,859 A | 12/1998 | Murata | 6,177,980 B1 | 1/2001 | Johnson |
| 5,862,164 A | 1/1999 | Hill | 6,181,458 B1 | 1/2001 | Brazas, Jr. et al. ......... 359/290 |
| 5,868,854 A | 2/1999 | Kojima et al. | 6,188,519 B1 | 2/2001 | Johnson |
| 5,886,675 A | 3/1999 | Aye et al. | 6,195,196 B1 | 2/2001 | Kimura et al. |
| 5,892,505 A | 4/1999 | Tropper | 6,197,610 B1 | 3/2001 | Toda |
| 5,895,233 A | 4/1999 | Higashi et al. | 6,210,988 B1 | 4/2001 | Howe et al. |
| 5,898,515 A | 4/1999 | Furlani et al. | 6,215,579 B1 | 4/2001 | Bloom et al. |
| 5,903,243 A | 5/1999 | Jones | 6,219,015 B1 | 4/2001 | Bloom et al. |
| 5,903,395 A | 5/1999 | Rallison et al. | 6,222,954 B1 | 4/2001 | Riza |
| 5,904,737 A | 5/1999 | Preston et al. | 6,229,650 B1 | 5/2001 | Reznichenko et al. |
| 5,910,856 A | 6/1999 | Ghosh et al. | 6,229,683 B1 | 5/2001 | Goodwin-Johanson |
| 5,912,094 A | 6/1999 | Aksyuk et al. | 6,241,143 B1 | 6/2001 | Kuroda |
| 5,912,608 A | 6/1999 | Asada | 6,249,381 B1 | 6/2001 | Suganuma |
| 5,914,801 A | 6/1999 | Dhuler et al. | 6,251,842 B1 | 6/2001 | Gudeman |
| 5,915,168 A | 6/1999 | Salatino et al. | 6,252,697 B1 | 6/2001 | Hawkins et al. |
| 5,919,548 A | 7/1999 | Barron et al. | 6,254,792 B1 | 7/2001 | Van Buskirk et al. |

| | | | |
|---|---|---|---|
| 6,261,494 B1 | 7/2001 | Zavracky et al. | |
| 6,268,952 B1 | 7/2001 | Godil et al. | |
| 6,271,145 B1 | 8/2001 | Toda | |
| 6,271,808 B1 | 8/2001 | Corbin | |
| 6,274,469 B1 | 8/2001 | Yu | |
| 6,282,213 B1 | 8/2001 | Gutin et al. | |
| 6,286,231 B1 | 9/2001 | Bergman et al. | |
| 6,290,859 B1 | 9/2001 | Fleming et al. | |
| 6,290,864 B1 | 9/2001 | Patel et al. | |
| 6,300,148 B1 | 10/2001 | Birdsley et al. | |
| 6,303,986 B1 | 10/2001 | Shook | |
| 6,310,018 B1 | 10/2001 | Behr et al. | |
| 6,313,901 B1 | 11/2001 | Cacharelis | |
| 6,323,984 B1 | 11/2001 | Trisnadi | |
| 6,327,071 B1 | 12/2001 | Kimura | |
| 6,342,960 B1 | 1/2002 | McCullough | |
| 6,346,430 B1 | 2/2002 | Raj et al. | |
| 6,356,577 B1 | 3/2002 | Miller | |
| 6,356,689 B1 | 3/2002 | Greywall | |
| 6,359,333 B1 | 3/2002 | Wood et al. | |
| 6,384,959 B1 | 5/2002 | Furlani et al. | |
| 6,387,723 B1 | 5/2002 | Payne et al. | |
| 6,392,309 B1 | 5/2002 | Wataya et al. | |
| 6,396,789 B1 | 5/2002 | Guerra et al. | |
| 6,418,152 B1 | 7/2002 | Davis | |
| 6,421,179 B1 | 7/2002 | Gutin et al. | |
| 6,438,954 B1 | 8/2002 | Goetz et al. | |
| 6,445,502 B1 | 9/2002 | Islam et al. | |
| 6,452,260 B1 | 9/2002 | Corbin et al. | |
| 6,466,354 B1 | 10/2002 | Gudeman | |
| 6,479,811 B1 | 11/2002 | Kruschwitz et al. | |
| 6,480,634 B1 | 11/2002 | Corrigan | |
| 6,497,490 B1 | 12/2002 | Miller | |
| 6,525,863 B1 | 2/2003 | Riza | |
| 6,563,974 B2 | 5/2003 | Agha Riza | |
| 6,565,222 B1 | 5/2003 | Ishii et al. | |
| 6,569,717 B1 | 5/2003 | Murade | |
| 2001/0019454 A1 | 9/2001 | Tadic-Galeb et al. | |
| 2002/0015230 A1 | 2/2002 | Pilossof et al. | |
| 2002/0021485 A1 | 2/2002 | Pilossof | |
| 2002/0079432 A1 | 6/2002 | Lee et al. | |
| 2002/0105725 A1 | 8/2002 | Sweatt et al. | |
| 2002/0112746 A1 | 8/2002 | DeYoung et al. | |
| 2002/0131228 A1 | 9/2002 | Potter | |
| 2002/0131230 A1 | 9/2002 | Potter | |
| 2002/0135708 A1 | 9/2002 | Murden et al. | |
| 2002/0176151 A1 | 11/2002 | Moon et al. | |
| 2002/0195418 A1 | 12/2002 | Kowarz et al. | |
| 2002/0196492 A1 | 12/2002 | Trisnadi et al. | |
| 2003/0056078 A1 | 3/2003 | Johansson et al. | |

FOREIGN PATENT DOCUMENTS

| | | | |
|---|---|---|---|
| DE | 197 51 716 A1 | 5/1998 | ............ G02B/27/14 |
| DE | 198 46 532 C1 | 5/2000 | ............ G02B/27/09 |
| EP | 0 089 044 A2 | 9/1983 | ............ H01L/23/10 |
| EP | 0 261 901 A2 | 3/1988 | ............ G09G/3/36 |
| EP | 0 314 437 A1 | 10/1988 | ............ H01L/25/08 |
| EP | 0 304 263 A2 | 2/1989 | ........ H01L/25/065 |
| EP | 0 306 308 A2 | 3/1989 | ............ H04N/3/14 |
| EP | 0 322 714 A2 | 7/1989 | ............ G02B/5/30 |
| EP | 0 627 644 A3 | 9/1990 | ............ G02B/27/00 |
| EP | 0 417 039 A1 | 3/1991 | ............ G03B/21/20 |
| EP | 0 423 513 A2 | 4/1991 | ............ H01S/3/085 |
| EP | 0 436 738 A1 | 7/1991 | ............ H04N/5/74 |
| EP | 0 458 316 A2 | 11/1991 | ............ G06K/11/06 |
| EP | 0 477 566 A2 | 4/1992 | ............ G02B/26/08 |
| EP | 0 488 326 A3 | 6/1992 | ............ G09G/3/28 |
| EP | 0 499 566 A2 | 8/1992 | ............ G06F/3/033 |
| EP | 0 528 646 A1 | 2/1993 | ............ G09G/3/02 |
| EP | 0 530 760 A2 | 3/1993 | ............ G09G/3/34 |
| EP | 0 550 189 A1 | 7/1993 | ............ G02F/1/315 |
| EP | 0 610 665 A1 | 8/1994 | ............ G09G/3/34 |
| EP | 0 627 644 A2 | 12/1994 | ............ G02B/27/00 |
| EP | 0 627 850 A1 | 12/1994 | ............ H04N/5/64 |
| EP | 0 643 314 A2 | 3/1995 | ............ G02B/27/00 |
| EP | 0 654 777 A1 | 5/1995 | ............ G09G/3/34 |
| EP | 0 658 868 A1 | 6/1995 | ............ G09G/3/34 |
| EP | 0 658 830 A1 | 12/1995 | ............ G09G/3/34 |
| EP | 0 689 078 A1 | 12/1995 | ............ G02B/26/08 |
| EP | 0 801 319 A1 | 10/1997 | ............ G02B/26/00 |
| EP | 0 851 492 A2 | 7/1998 | ......... H01L/23/538 |
| EP | 1 003 071 A2 | 5/2000 | ............ G03B/27/72 |
| EP | 1 014 143 A1 | 6/2000 | ............ G02B/26/08 |
| EP | 1 040 927 A2 | 10/2000 | ............ B41J/2/455 |
| GB | 2 117 564 A | 10/1983 | ............ H01L/25/08 |
| GB | 2 118 365 A | 10/1983 | ............ H01L/27/13 |
| GB | 2 266 385 A | 10/1993 | ............ G02B/23/10 |
| GB | 2 296 152 A | 6/1996 | ............ H04N/13/04 |
| GB | 2 319 424 A | 5/1998 | ............ H04N/13/04 |
| JP | 53-39068 | 4/1978 | ............ H01L/23/12 |
| JP | 55-111151 | 8/1980 | ............ H01L/27/00 |
| JP | 57-31166 | 2/1982 | ............ H01L/23/48 |
| JP | 57-210638 | 12/1982 | ............ H01L/21/60 |
| JP | 60-49638 | 3/1985 | ............ H01L/21/60 |
| JP | 60-94756 | 5/1985 | ............ H01L/25/04 |
| JP | 60-250639 | 12/1985 | ............ H01L/21/58 |
| JP | 61-142750 | 6/1986 | ............ H01L/21/60 |
| JP | 61-145838 | 7/1986 | ............ H01L/21/60 |
| JP | 63-234767 | 9/1988 | ............ H04N/1/04 |
| JP | 63-305323 | 12/1988 | ............ G02F/1/13 |
| JP | 1-155637 | 6/1989 | ............ H01L/21/66 |
| JP | 40-1155637 | 6/1989 | ............ H01L/21/92 |
| JP | 2219092 | 8/1990 | ............ G09G/3/28 |
| JP | 4-333015 | 11/1992 | ............ G02B/27/18 |
| JP | 7-281161 | 10/1995 | ......... G02F/1/1333 |
| JP | 3288369 | 3/2002 | ............ G02B/26/06 |
| WO | WO 90/13913 | 11/1990 | ............ H01L/23/10 |
| WO | WO 92/12506 | 7/1992 | ............ G09F/9/37 |
| WO | WO 93/02269 | 2/1993 | ............ E06B/5/10 |
| WO | WO 93/09472 | 5/1993 | ............ G03F/7/20 |
| WO | WO 93/18428 | 9/1993 | ............ G02B/27/00 |
| WO | WO 93/22694 | 11/1993 | ............ G02B/5/18 |
| WO | WO 94/09473 | 4/1994 | ............ G09G/3/34 |
| WO | WO 94/29761 | 12/1994 | ............ G02B/27/24 |
| WO | WO 95/11473 | 4/1995 | ............ G02B/27/00 |
| WO | WO 96/02941 | 2/1996 | ............ H01L/23/02 |
| WO | WO 96/08031 | 3/1996 | ............ H01J/29/12 |
| WO | WO 96/41217 | 12/1996 | ............ G02B/5/18 |
| WO | WO 96/41224 | 12/1996 | ............ G02B/19/00 |
| WO | WO 97/22033 | 6/1997 | ............ G02B/27/22 |
| WO | WO 97/26569 | 7/1997 | ............ G02B/5/18 |
| WO | WO 98/05935 | 2/1998 | ............ G01L/9/06 |
| WO | WO 98/24240 | 6/1998 | ............ H04N/9/31 |
| WO | WO 98/41893 | 9/1998 | ............ G02B/26/08 |
| WO | WO 99/07146 | 2/1999 | ............ H04N/7/16 |
| WO | WO 99/12208 | 3/1999 | ......... H01L/25/065 |
| WO | WO 99/23520 | 5/1999 | ............ G02B/26/08 |
| WO | WO 99/34484 | 7/1999 | |
| WO | WO 99/59335 | 11/1999 | ............ H04N/5/765 |
| WO | WO 99/63388 | 12/1999 | ............ G02B/27/22 |
| WO | WO 99/67671 | 12/1999 | ............ G02B/26/08 |
| WO | WO 00/04718 | 1/2000 | ............ H04N/7/167 |
| WO | WO 00/07225 | 2/2000 | ............ H01L/21/00 |
| WO | WO 01/04674 A1 | 1/2001 | ............ G02B/6/12 |
| WO | WO 01/006297 A3 | 1/2001 | ............ G02B/27/10 |
| WO | WO 01/57581 A1 | 8/2001 | ............ G02B/27/48 |
| WO | WO 02/025348 A3 | 3/2002 | ............ G02B/26/02 |
| WO | WO 02/31575 A2 | 4/2002 | ............ G02B/27/00 |
| WO | WO 02/058111 A2 | 7/2002 | |
| WO | WO 02/065184 A3 | 8/2002 | ............ G02B/27/12 |
| WO | WO 02/073286 A2 | 9/2002 | ............ G02B/26/08 |
| WO | WO 02/084375 A1 | 10/2002 | ............ G02B/26/08 |

| | | | | |
|---|---|---|---|---|
| WO | WO 02/084397 A3 | 10/2002 | ............ | G02B/27/18 |
| WO | WO 03/001281 A1 | 1/2003 | ............ | G02F/1/01 |
| WO | WO 03/001716 A1 | 1/2003 | ............ | H04J/14/02 |
| WO | WO 03/012523 A1 | 2/2003 | ............ | G02B/26/00 |
| WO | WO 03/016965 A1 | 2/2003 | ............ | G02B/5/18 |
| WO | WO 03/023849 A1 | 3/2003 | ............ | H01L/23/02 |
| WO | WO 03/025628 A2 | 3/2003 | | |

OTHER PUBLICATIONS

O. Solgaard, "Integrated Semiconductor Light Modulators for Fiber–Optic and Display Applications", Ph.D. Dissertation, Stanford University Feb., 1992.

J. Neff, "Two–Dimensional Spatial Light Modulators: A Tutorial", Proceedings of the IEEE, vol. 78, No. 5 (May 1990), pp. 826–855.

R. Gerhard–Multhaupt, "Viscoelastic Spatial Light Modulators and Schlieren–Optical Systems for HDTV Projection Displays" SPIE vol. 1255 Large Screen Projection 11 (1990), pp. 69–78.

R. Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

F. Sandejas, R. Apte, W. Banyai, and D. Bloom, "Surface Microfabrication of Deformable Grating Valve for High Resolution Displays," The 7$^{th}$ International Conference on Solid–State Sensors and Actuators No Date Available.

P. Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, Chelmsford, Essex, GB 1993.

M. Farn et al., "Color Separation by use of Binary Optics," Optics Letters, vol. 18:15 pp. 1214–1216, 1993.

P. Alvelda, "VLSI Microdisplays and Optoelectric Technology," MIT, pp. 1–93, 1995.

P. Alvelda, "VLSI Microdisplay Technology," Oct. 14, 1994.

D. Rowe, "Laser Beam Scanning," SPIE, vol. 2088, Oct. 5, 1993, 18–26.

L. Hornbeck, "Deformable–Mirror Spatial Light Modulators," Spatial Light Modulators and Applications III, Aug. 8, CA 1989, pp. 86–102.

Russick et al., "Supercritical Carbon Dioxide Extraction of Solvent from Micromachined Structures," Supercritical Fluids, Chapter 18, American Chemical Society, pp 255–269, 1997.

Buhler et al., "Linear Array of Complementary Metal Oxide Semiconductor Double–Pass Metal Micromirrors," Optical Engineering, vol. 36, No. 5, pp. 1391–1398, May 1997.

Gani et al., "Variable Gratings for Optical Switching: Rigorous Electromagnetic Simulation and Design," Optical Engineering, vol. 38, No. 3, pp 552–557, Mar. 1999.

R. Tepe, et al. "Visoelastic Spatial Light Modulator with Active Matrix Addressing," Applied Optics, vol. 28, No. 22, New York, USA, pp. 4826–4834, Nov. 15, 1989.

W. Brinker, et al., "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellette Grating and its Application to Tunable Laser Resonator," Electronics and Communications in Japan, vol. 63–c, No. 10, pp. 94–100, Japan, 1980.

Burns, D.M. et al., *Development of microelectromechanical variable blaze gratings*, Sensors and Actuators A, pp. 7–15, 1998.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

"Kitchen Computer", IBM Technical Disclosure Bulletin, vol. 37, No. 12, pp. 223–225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long–Haul WDM Communication Systems" IEEE Photonics Technology Letters, vol. 9, No. 3, Mar. 1997.pp. 377 of 379.

N. J. Frigo et al., "A Wavelength–Division Multiplexed Passive Optical Network with Cost–Shared Components", IEEE Photonics Technology Letters, vol. 6, No. 11, Nov. 1994, pp. 1365–1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995–1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "Invited Paper: Grating Light Valve™ Technology: Update and Novel Applications," SID Digest, vol. 29, 1998.

Development of Digital MEMS–Based Display Technology Promise Improved Resolution, Contrast, and Speed, XP–000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, p. 103–115.

Olga B. Spahn, et al., "High Optical Power Handling of Pop–Up Microelectromechanical Mirrors", Sandia National Laboratories, IEEE 2000, p. 51–52.

David M. Burns, et al. "Optical Power Induced Damage to Microelectromechanical Mirrors", Sensors and Actuators A 70, 1998, p. 6–14.

V.S. Aliev et al., "Development of Si(100) surface roughness at the initial stage of etching in F2 and XeF2 gases: ellipsometric study," Surface Science 442 (1999), pp. 206–214.

Xuan–Qi Wang et al., "Gas–Phase Silicon Etching with Bromine Trifluoride," Depart. of Electrical Engineering, 136–93 California Institute of Technology, 1997 IEEE, pp. 1505–1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927–931.

F.A. Houle, "Dynamics of SiF4 desorption during etching of silicon by XeF2," J. Chem. Phys. 87 (3), Aug. 1, 1987, pp. 1866–1872.

Mehran Mehregany, "Microelectromechanical Systems," 1993 IEEE pp. 14–22.

D. Moser et al., "A CMOS Compatible Thermally Excited Silicon Oxide Beam Resonator with Aluminium Mirror," Physical Electronics Laboratory, 1991 IEEE, pp. 547–550.

M. Parameswaran et al., "Commercial CMOS Fabricated Integrated Dynamic Thermal Scene Simulator," 1991 IEEE pp. 29.4.1–29.4.4.

M. Parameswaran et al., "CMOS Electrothermal Microactuators," Depart. of Electrical Engineering, 1990 IEEE, pp. 128–131.

U. Streller et al., "Selectivity in dry etching of Si(100) with XeF2 and VUV light," Applied Surface Science 106, (1996), pp. 341–346.

M.J.M Vugts et al., "Si/XeF2 etching: Temperature dependence," 1996 American Vacuum Society, pp. 2766–2774.

P. Krummenacher et al., "Smart Temperature Sensor in CMOS Technology," Sensors and Actuators, A–21–A–23 (1990), pp. 636–638.

Henry Baltes, "CMOS as sensor technology," Sensors and Actuators A. 37–38, (1993), pp. 51–56.

Thomas Boltshauser et al., "Piezoresistive Membrane Hygrometers Based on IC Technology," Sensor and Materials, 5, 3, (1993), pp. 125–134.

Z. Parpia et al., "Modelling of CMOS Compatible High Voltage Device Structures," pp. 41–50. No Date Available.

Jon Gildemeister, "Xenon Difluoride Etching System," 1997, UC Berkeley MicroTabrication Manual Chapter 7.15, p. 2–5.

W. Riethmuller et al., "A smart accelerometer with on–chip electronics fabricated by a commercial CMOS process," Sensors and Actuators A. 31, (1992), 121–124.

W. Gopel et al., "Sensors– A Comprehensive Survey," vol. 7, Weinheim New York, 44 pgs. No Date Available.

D. E. Ibbotson et al., "Comparison of XeF2 and F–atom reations with Si and SiO2," 1984 American Institute of Physics, pp. 1129–1131.

D. E. Ibbotson et al., "Plasmaless dry etching of silicon with fluorine–containing compounds," 1984 American Institute of Physics, pp. 2939–2942.

M.H. Hecht et al., "A novel x–ray photoelectron spectroscopy study of the AI/SiO2 interfaces," 1985 American Institute of Physics, pp. 5256–52616.

Daniel L. Flamm et al., "XeF2 and F–Atom Reactions with Si: Their Significance for Plasma Etching,," Solid State Technology, V. 26, #4, 4/83, pp. 117–121 Apr. 1983.

H.F. Winters et al., "The etching of silicon with XeF2 vapor," Appl. Phys. Lett. vol. 34, No. 1, Jan. 1979, pp. 70–73.

Wayne Bailey et al., "Microelectronic Structures and Microelectromechanical Devices for Optical Processing and Multimedia Applications," SPIE—The International Society for Optical Engineering, vol. 2641–Oct. 1995, 13 pgs.

J. Marshall et al., "Realizing Suspended Structures on Chips Fabricated by CMOS Foundry Processes Through the MOSIS Service," National Inst. of Standards and Technology, Jun. 94, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison–Wesley, $2^{nd}$ edition, 1987, Adelphi University, pp. 163–169.

E. Hecht, "Optics", Addison–Wesley, $2^{nd}$ edition, 1987, Adelphi University, pp. 358–360.

T. Glaser et al., "Beam switching with binary single–order diffractive grating", XP–00802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP–002183475, Dept. of Applied Physics, Calcutta University, 1975, pp. 63–67.

J. W. Goodman, "Some Fundamental Properties of Speckle", XP–002181682, Dept. of Electrical Engineering, Stanford University, 1976, p. 1146–1150.

Lingli Wang et al., "Speckle Reduction in Laser Projection Systems by Diffractive Optical Elements", XP–000754330, Applied Optics, Apr. 1, 1998, vol. 37, No. 10, pp. 1770–1775.

R.W. Corrigan et al., "Calibration of a Scanned Linear Grating Light–Valve, Projection System for E. Cinema Applications", Silicon Light Machine, SID'99, San Jose, CA, 27 pgs, 1999.

R.W. Corrigan et al., "Calibration of a Scanned Linear Grating Light–Valve, Projection System", Silicon Light Machines, San Jose, CA, 4 pgs, May 18, 1999.

"Introduction to Cryptography", http://www.ssh.fi/tech/erpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral–Density Filters," New Focus, Inc., Santa Clara, CA, www.newfocus.com, May 7, 1999.

J. Hawkes et al., "Laser Theory and Practice," Prentice Hall, New York, 1995, pp. 407–408.

C. Tew et al., "Electronic Control of a Digital Micromirror Device for Projection Displays", Proceedings of the 1994 IEEE International Solid–State Circuits Conference, 1994.

Henck, S.A., "Lubrication of Digital Micromirror Devices™", Tribology Letters, No. 3, pp. 239–247, 1997.

K. W. Goossen et al., "Silicon Modulator Based on Mechanically–Active Anti–Reflection Layer with 1 Mbit/sec Capability for Fiber–in–the–Loop Applications", IEEE Protonics Technology Letters, vol. 6, No. 9, Sep. 1994, pp. 1119–1121.

J. A. Walker et al., "Demonstration of a Gain Flattened Optical Amplifier with Micromechanical Equalizer Element", Lucent Technologies, pp. 13–14 No Date Available.

A: P. Payne et al., "Resonance Measurements of Stresses in Al/Si$_3$N$_4$ Micro–Ribbons", Silicon Light Machines, Sep. 22, 1999, 11 pgs.

M.W. Miles, "A New Reflective FPD Technology Using Interferometric Modulation", 4 pgs. No Date Available.

N. A. Riza et al., "Digitally Controlled Fault–Tolerant Multiwavelength Programmable Fiber–Optic Attenuator Using a Two–Dimensional Digital Micromirror Device", Optics Letters, Mar. 1, 1999, vol. 24, No. 5, pp. 282–284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309–2318.

P. Alvelda et al., "44:4: Ferroelectric Microdisplays Using Distortion–Compensated Pixel Layouts", SID 95 Digest, XP 2020715, pp. 931–933.

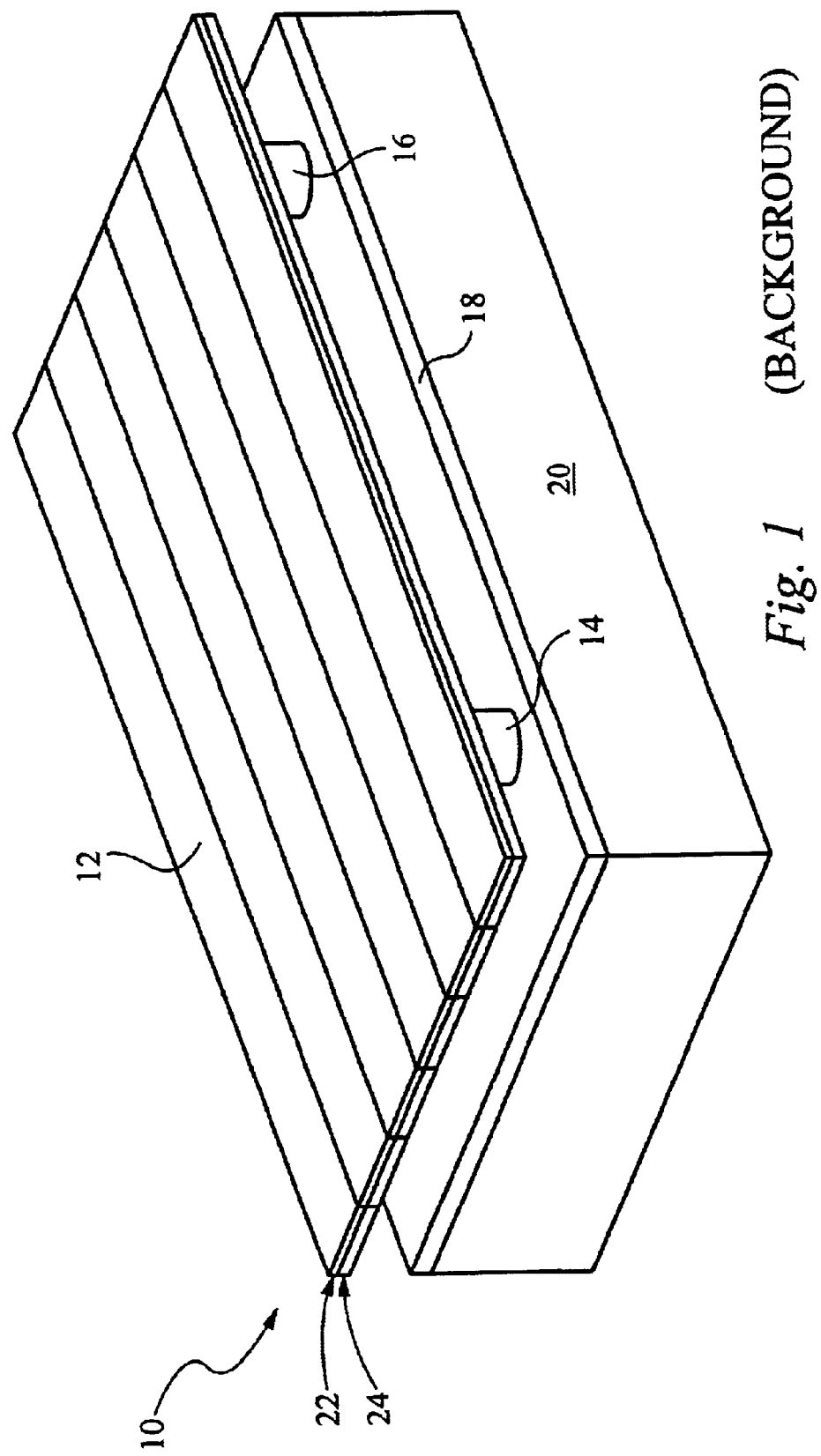
Fig. 1 (BACKGROUND)

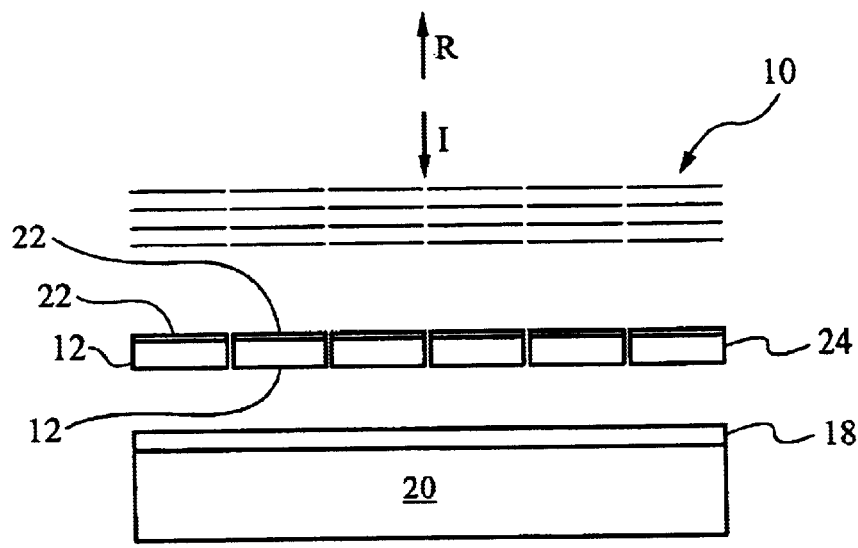
*Fig. 2* (BACKGROUND)
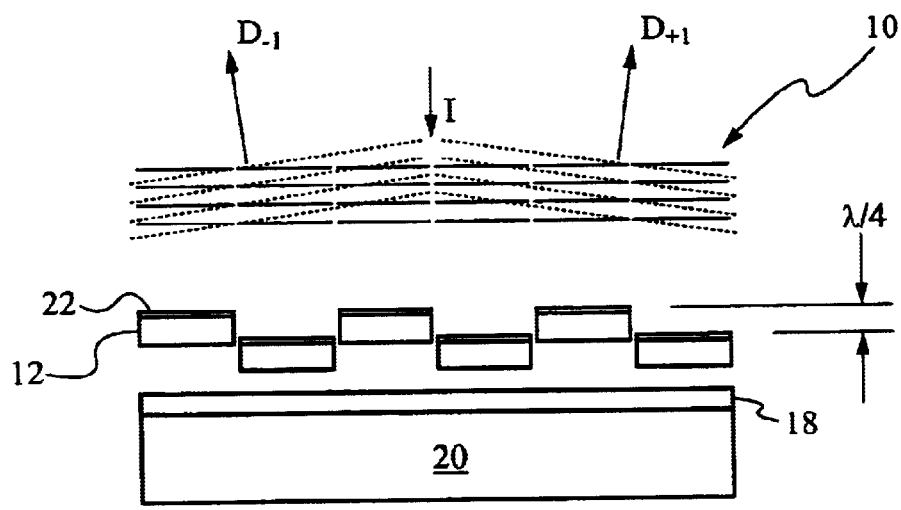
*Fig. 3* (BACKGROUND)

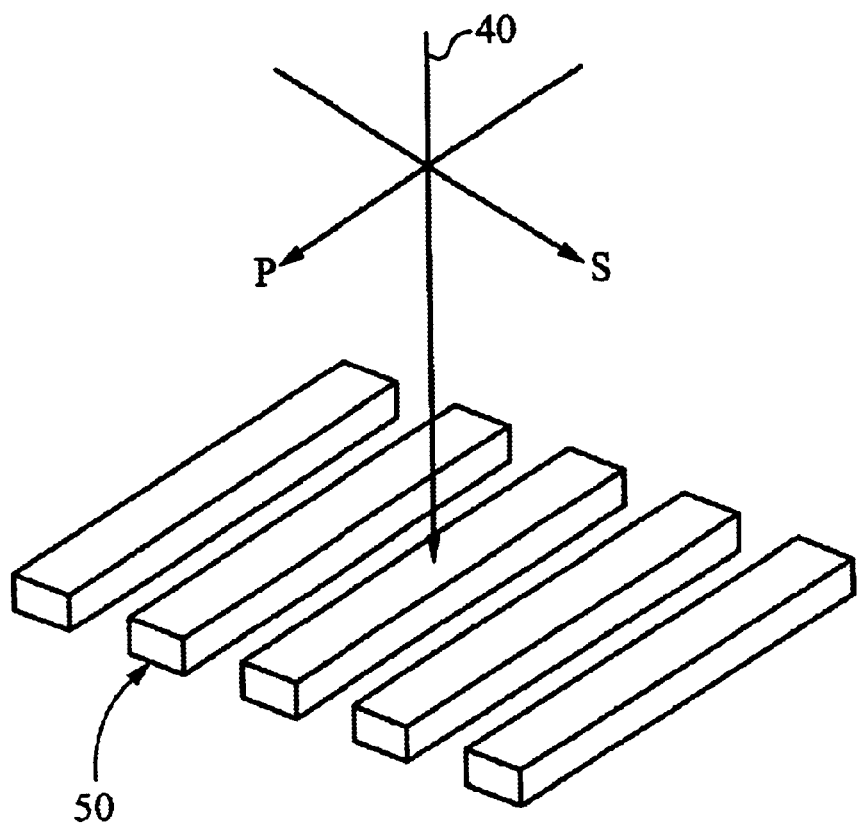
*Fig. 4* (BACKGROUND)

PDL MITIGATION STRUCTURE FOR DIFFRACTIVE MEMS AND GRATINGS

FIELD OF THE INVENTION

The present invention relates to an apparatus for mitigating the effects of Polarization Dependent Losses (PDL). More particularly, this invention relates to a structure for PDL mitigation for diffractive MEMS and gratings.

BACKGROUND OF THE INVENTION

Designers and inventors have sought to develop a light modulator which can operate alone or together with other modulators. Such modulators should provide high operating speeds (KHz frame rates), a high contrast ratio or modulation depth, have optical flatness, be compatible with VLSI processing techniques, be easy to handle and be relatively low in cost. Two such related systems are found in U.S. Pat. Nos. 5,311,360 and 5,841,579 which are hereby incorporated by reference.

According to the teachings of the '360 and '579 patents, a diffractive light modulator is formed of a multiple mirrored-ribbon structure. An example of such a diffractive light modulator 10 is shown in FIG. 1. The diffractive light modulator 10 comprises elongated elements 12 suspended by first and second posts, 14 and 16, above a substrate 20. The substrate 20 comprises a conductor 18. In operation, the diffractive light modulator 10 operates to produce modulated light selected from a reflection mode and a diffraction mode.

FIGS. 2 and 3 illustrate a cross-section of the diffractive light modulator 10 in a reflection mode and a diffraction mode, respectively. The elongated elements 12 comprise a conducting and reflecting surface 22 and a resilient material 24. The substrate 20 comprises the conductor 18.

FIG. 2 depicts the diffractive light modulator 10 in the reflection mode. In the reflection mode, the conducting and reflecting surfaces 22 of the elongated elements 12 form a plane so that incident light I reflects from the elongated elements 12 to produce reflected light R.

FIG. 3 depicts the diffractive light modulator 10 in the diffraction mode. In the diffraction mode, an electrical bias causes alternate ones of the elongated elements 12 to move toward the substrate 20. The electrical bias is applied between the reflecting and conducting surfaces 22 of the alternate ones of the elongated elements 12 and the conductor 18. The electrical bias results in a height difference between the alternate ones of the elongated elements 12 and non-biased ones of the elongated elements 12. A height difference of a quarter wavelength $\lambda/4$ of the incident light I produces maximum diffracted light including plus one and minus one diffraction orders, $D_{+1}$ and $D_{-1}$. In the diffraction mode, the diffractive modulator forms an optical structure similar to a square well grating.

FIGS. 2 and 3 depict the diffractive light modulator 10 in the reflection and diffraction modes, respectively. For a deflection of the alternate ones of the elongated elements 12 of less than a quarter wavelength $\lambda/4$, the incident light I both reflects and diffracts producing the reflected light R and the diffracted light including the plus one and minus one diffraction orders, $D_{+1}$ and $D_{-1}$. In other words, by deflecting the alternate ones of the elongated elements 12 less the quarter wavelength $\lambda/4$, the diffractive light modulator 10 produces a variable reflectivity.

Unfortunately, when arbitrarily polarized light impinges on the diffractive light modulator depicted in FIGS. 2 and 3, different polarization states interact with the diffractive light modulator differently. As depicted in FIG. 4, at a given instant in time, any arbitrarily polarized light incident upon the diffractive modulator, or grating, can be decomposed into two components; one where the electric field of the light is parallel to the ribbons, or grating grooves, henceforth referred to as P, and another where the electric field of the light is perpendicular to the ribbons, or grating grooves, henceforth referred to as S. Two polarization states are deemed to be different if the ratio of the P and S components for the two states is different. The electric field of the P component initiates an oscillation in the electrons or dipole of a reflector along the ribbon length, and the S component initiates an oscillation in the electrons or dipoles of the reflector in a direction perpendicular to the ribbons. When the oscillating electrons or dipole returns to its original state, it emits, or scatters, light back. The extent of light scattered back depends on the extent of the induced oscillation, which in turn depends on the wavelength of light, the proximity of the oscillating electrons or dipole to the physical boundary of the material, and the fact that the electric field has to be continuous at the material boundaries. For the predominant effect, the oscillations induced by the electric field of the P component interact differently with the ribbon edge than the oscillations induced by the electric field of the S component. This results in a different extent of back scattering for P and S components. Therefore, different polarization states with different ratios of P and S components exhibit different amounts of loss for the light reflected or diffracted back. This leads to Polarization Dependent Losses (PDL) in which one polarization state is attenuated more than the other.

For telecommunications applications where the polarization state at the input of a device is not guaranteed and changes with time, PDL causes the intensity of light at the output of the device to vary with time. This results in the degradation of the quality of the transmission and therefore PDL in the device must be minimized. What is needed is a diffractive light modulator with an output response that is as independent of the polarization state as possible.

SUMMARY OF THE INVENTION

Embodiments of the present invention include a diffractive MEMS for modulating or switching an incident beam of light. The diffractive MEMS includes a plurality of elements, each element including a first end, a second end, a first non-linear side, a second non-linear side, and a light reflective planar surface. The light reflective planar surfaces of the plurality of elements lie in one or more parallel planes. The elements are preferably arranged parallel to each other. The modulator also includes a support structure to maintain a position of each element relative to each other and to enable movement of selective ones of the plurality of elements in a direction normal to the one or more parallel planes of the plurality of elements. The plurality of elements are preferably moved between a first modulator configuration wherein the plurality of elements act to reflect the incident beam of light as a plane mirror, and a second modulator configuration wherein the plurality of elements act to diffract the incident beam of light.

The first non-linear side and the second non-linear side can each include one or more projections. The shape of the projection can be an arc, sinusoid, triangle, square or any polygon. Each projection on the first non-linear side can be repeated according to a constant period, and each projection on the second non-linear side can be repeated according to a constant period. The period of the first non-linear side and the period of the second non-linear side can be the same. The shape of each projection can be the same. The projections on the first non-linear side can be symmetric in relation to the projections on the second non-linear side.

The first non-linear side can form a recurring pattern and the second non-linear side can form a recurring pattern. The recurring pattern on each side can be the same. The recurring pattern on the first non-linear side can be symmetric in relation to the recurring pattern on the second non-linear side. The recurring pattern can be formed by alternating halves of a circle. The recurring pattern can be formed by alternating a sector of a circle and the mirror image of the sector. The recurring pattern can be a sinusoid, triangle, square or any polygon.

The non-linear sides of adjacent elements are preferably separated by a constant gap width. The modulator can be a diffractive MEMS device. The selective ones of the elements are preferably alternating elements and can be moved by applying an electrostatic force.

BRIEF DESCRIPTION OF THE DRAWINGS

FIG. 1 illustrates an exemplary diffractive light modulator.

FIG. 2 illustrates a cross-section of the exemplary diffractive light modulator in a reflection mode.

FIG. 3 illustrates a cross-section of the exemplary diffractive light modulator in a diffraction mode.

FIG. 4 illustrates an arbitrarily polarized light impinging a diffractive light modulator.

DETAILED DESCRIPTION OF THE EMBODIMENTS

The present invention overcomes deficiencies of conventional approaches by performing non-linear ribbon cuts at the edges of the ribbons within a diffractive light modulator, thereby providing ribbons with non-linear sides. The non-linear sides substantially reduce the PDL for reflection and diffraction from such ribbons in response to random input polarization states. Preferably, the non-linear sides form a recurring pattern. More preferably, the recurring pattern is formed by alternating halves of a circle. Alternatively, the recurring pattern is formed by alternating a sector of a circle and the mirror image of the sector, by alternating halves of a polygon, for example a square, rectangle or triangle, by a sinusoid, or by a zigzag. Alternatively, the non-linear sides include one or more projections. The projections can form a recurring pattern or the projections can be random. Preferably, each projection or recurring pattern is consistent through the thickness of the ribbon. In this manner, the projection or recurring pattern is symmetric in the third dimension, or 3-D symmetric. The aforementioned non-linear sides act to normalize the profile seen by any incident light including a random polarization state. In the case of the preferred embodiment, the recurring pattern formed by alternating halves of a circle appears as substantially the same profile to both the polarization states TM and TE at the boundary of the ribbon. This evokes substantially the same diffraction response which manifests itself as low PDL.

Figure 5:
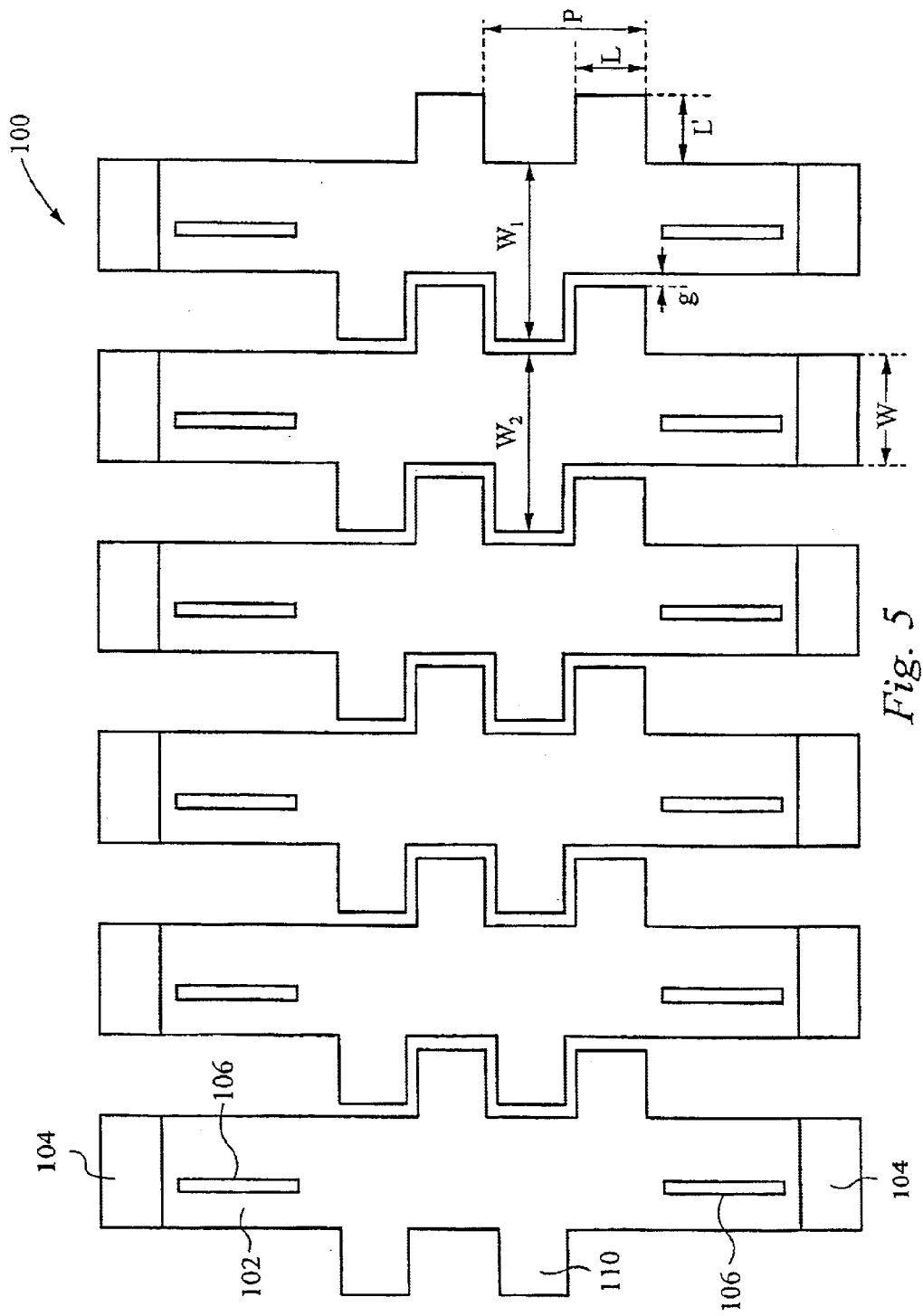
FIG. 5 illustrates a first embodiment of a plurality of elements included within a diffractive light modulator.

FIG. 5 illustrates a first embodiment of a plurality of elements included within a diffractive light modulator. Preferably, the diffractive light modulator comprises a grating light valve™ light modulator 100. Preferably, each element within the grating light valve™ light modulator 100 is a ribbon 102. Each ribbon 102 includes a first end supported by a post 104, a second end supported by another post 104, and a reflective layer as its topmost layer. Preferably, the reflective layer is also conducting. The posts 104 support the ribbons 102 to maintain the position of each ribbon 102 relative to each other. The posts 104 are preferably coupled to a substrate. The support posts 104 also enable the movement of selected ones of the ribbons 102 in a direction normal to a substrate of the grating light valve™ light modulator 100, discussed in greater detail below. Although each ribbon 102 is preferably supported at its ends by a post, it is understood that any means for supporting the ribbons to maintain the position of each ribbon 102 relative to each other and to enable movement in a direction normal to the substrate of the grating light valve™ light modulator 100 can be used.

It will be readily apparent to one skilled in the art that the conducting and reflecting layer can be replaced by a multi-layer dielectric reflector in which case a conducting element would also be included in each of the elongated elements. Further, it will be readily apparent to one skilled in the art that the conducting and reflecting layer can be coated with a transparent layer such as an anti-reflective layer.

Preferably, each of the plurality of ribbons are arranged in parallel. Each ribbon 102 is separated from an adjacent ribbon 102 by a gap g. Preferably, the gap g is constant.

Each ribbon 102 includes a first non-linear side and a second non-linear side, where each non-linear side includes one or more projections. As illustrated in FIG. 5, the projections in the first embodiment are squares. Specifically, the non-linear sides of each ribbon 102 include square projections 110. Preferably, each side of the square projection 110 is of length L. The square projections 110 preferably repeat every period P. In this manner, the square projections 110 form a recurring pattern with period P. As can be seen in FIG. 5, the recurring pattern on the first non-linear side is out-of-phase with the recurring pattern on the second non-linear side. Specifically, the recurring patterns on both non-linear sides are out-of-phase by 180 degrees. To alternatively describe this square projection recurring pattern, each non-linear edge can be defined as a function. The function in this case is alternating halves of a square. An axis of this function is a line parallel to and a distance L/2 outside of a linear edge defined by a ribbon width W of the ribbon 102.

Each ribbon 102 includes the ribbon width W. For any given ribbon, an effective width is defined as the width of the ribbon at the point where incident light impinges the ribbon. The effective width can be defined as the ribbon width W plus the projection width at that point. The effective width can also be defined as the ribbon width in an active area of the ribbon 102. The active area is a portion of the ribbon 102 in which the incident light impinges. In the first embodiment, a projection width L' is equal to the projection length L, since the projection is a square. Therefore, a first effective width W1 equals W+L. As can be seen in FIG. 5, the effective width of each ribbon 102 is the same. Specifically, the effective width W1 is equal to a second effective width W2 of an adjacent ribbon 102. To achieve good contrast, the effective width of adjacent ribbons should be equal, as is the case in the first embodiment. More specifically, it is the reflectivity effective width of adjacent ribbons that should be equal in order to achieve good contrast. However, in the case where reflectivity is constant over the width of the ribbon, it is the effective width that should be equal.

Each ribbon 102 can also include one or more slits 106. The slits can be placed in a non-active area of the ribbon 102 to relieve stress. The non-active area is a portion of the ribbon 102 in which the incident light does not impinge. Although only a single slot 106 is illustrated in FIG. 5, it is understood that more slits can be used as necessary.

The grating light valve™ light modulator 100 is operated in a similar manner as a conventional grating light valve™ light modulator. In a reflection mode, the reflecting layers of the ribbons 102 form a plane so that incident light I reflects from the ribbons 102 to produce reflected light R. The reflected light R is reflected in the zero order.

In a diffraction mode, an electrical bias causes alternate ones of the ribbons 102 to move toward the substrate of the grating light valve™ light modulator 100. The electrical bias is applied between the reflecting and conducting layers of the alternate ones of the ribbons 102 and a conductor on the substrate. The electrical bias results in a height difference between the alternate ones of the ribbons 102 and non-biased ones of the ribbons 102. A height difference of a quarter wavelength $\lambda/4$ of the incident light I produces maximum diffracted light including plus one and minus one diffraction orders, $D_{+1}$ and $D_{-1}$. For a deflection of the alternate ones of the ribbons 102 of less than a quarter wavelength $\lambda/4$, the incident light I both reflects and diffracts producing the reflected light R and the diffracted light including the plus one and minus one diffraction orders, $D_{+1}$ and $D_{-1}$. In other words, by deflecting the alternate ones of the ribbons 102 less the quarter wavelength $\lambda/4$, the diffractive light modulator 100 produces a variable reflectivity.

Figure 6:
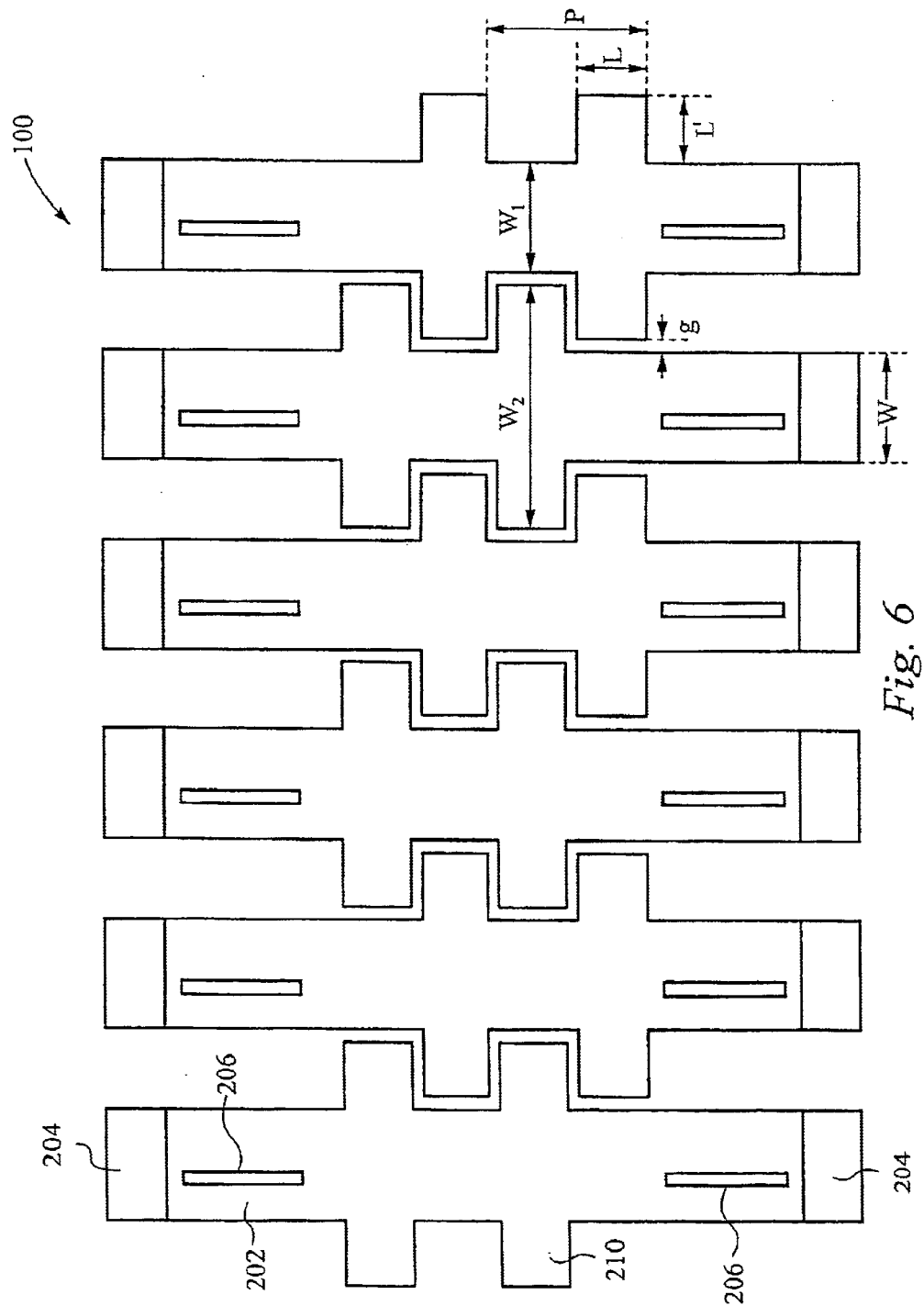
FIG. 6 illustrates a second embodiment of a plurality of elements included within a diffractive light modulator.

FIG. 6 illustrates a second embodiment of a plurality of elements included within a diffractive light modulator. The second embodiment differs from the first embodiment in that the recurring pattern on the first non-linear side is symmetrical with the recurring pattern on the second non-linear side. In other words, the recurring patterns on both non-linear sides are in-phase. Due to this symmetry, less lateral stress is applied to each ribbon 202 within the second embodiment than to each ribbon 102 within the first embodiment. As a result, the second embodiment is more mechanically stable than the first embodiment. However, the second embodiment does not provide as high contrast as the first embodiment. As discussed above, higher contrast is achieved when the effective width of adjacent ribbons is equal. This is the case in the first embodiment. However, as can be seen in FIG. 6, the effective width W1 and W2 of two adjacent ribbons 202 are not equal. Since W1 is not equal to W2, the contrast provided by the second embodiment is not as high as the contrast provided by the first embodiment.

Figure 7:
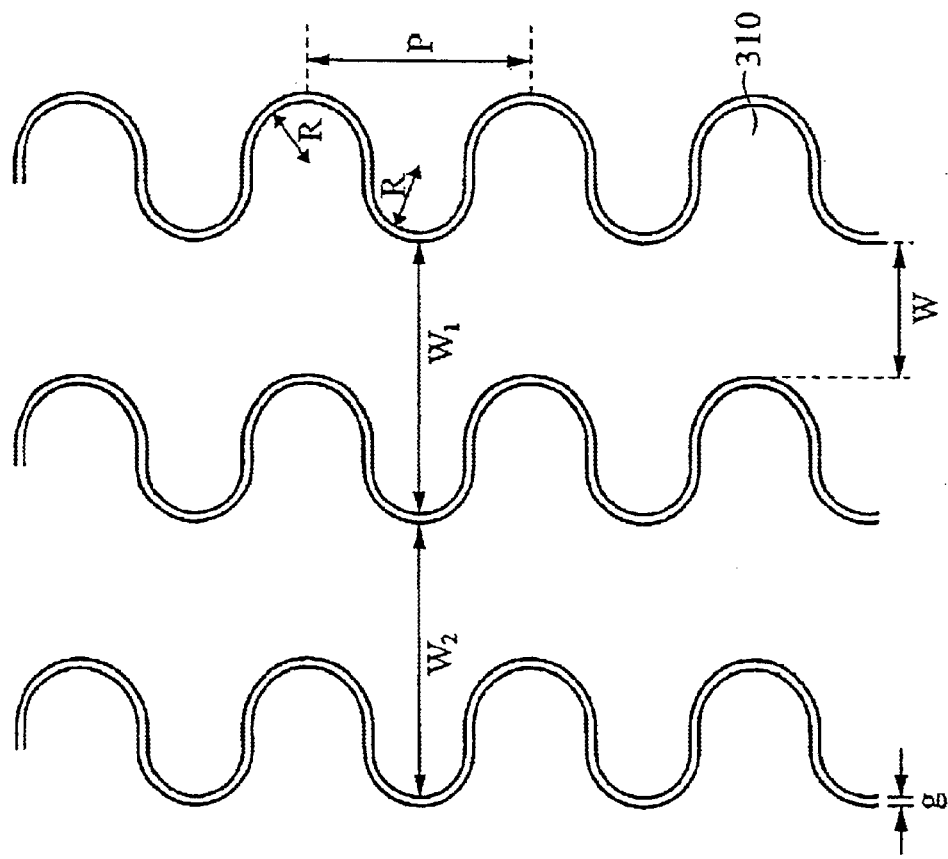
FIG. 7 illustrates a third and preferred embodiment of a plurality of elements included within an active area of a diffractive light modulator.

FIG. 7 illustrates a third and preferred embodiment of a plurality of elements included within an active area of a diffractive light modulator. The third embodiment is similar to the first embodiment except that the recurring pattern on each non-linear side is different. Specifically, the non-linear sides of each ribbon 302 in the third embodiment include half-circle projections 310. Each half-circle projection 310 includes a radius R. The half-circle projection 310 and a mirror image of the half-circle projection 310 preferably repeats every period P. In this manner, the half-circle projections 310 form a recurring pattern with period P. As can be seen in FIG. 7, the recurring pattern on the first non-linear side is out-of-phase with the recurring pattern on the second non-linear side. Specifically, the recurring patterns on both non-linear sides are out-of-phase by 180 degrees. To alternatively describe this half-circle projection recurring pattern, each non-linear edge can be defined as a function. The function in this case is alternating halves of a circle. An axis of this function is a line parallel to and a distance R outside of a straight line defined by a ribbon width W of the ribbon 302. FIG. 7 illustrates the active area of the grating light valve™ light modulator 100. As such, posts on either end of the elements 302 are not shown in FIG. 7.

Similarly to the first embodiment, the effective widths W1 and W2 of adjacent ribbons 302 are equal. As such, the third embodiment of the grating light valve™ light modulator 100 provides high contrast operation.

Figure 8:
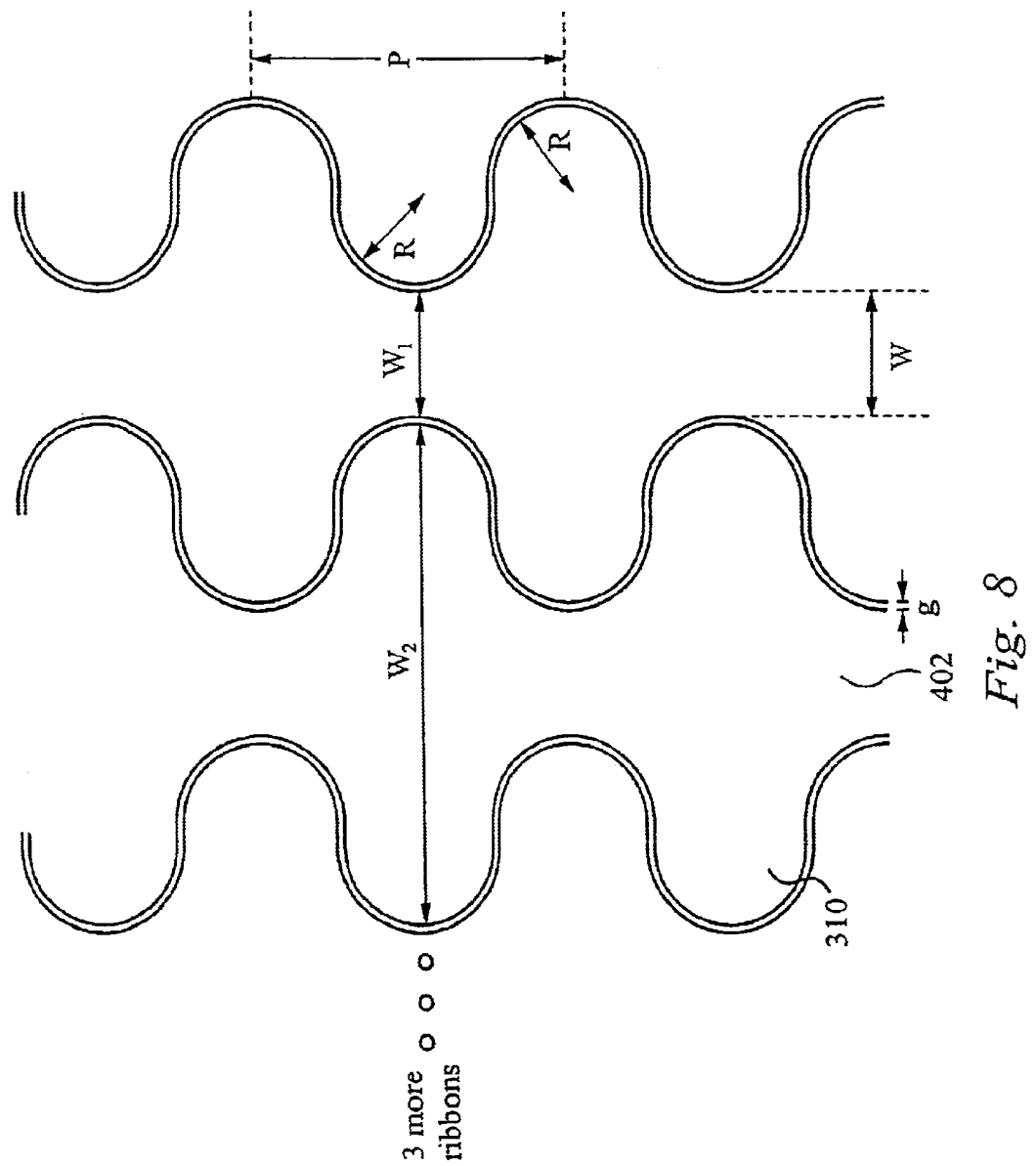
FIG. 8 illustrates a fourth embodiment of a plurality of elements included within an active area of a diffractive light modulator.

FIG. 8 illustrates a fourth embodiment of a plurality of elements included within an active area of a diffractive light modulator. The fourth embodiment differs from the third embodiment in that the recurring pattern on the first non-linear side is symmetrical with the recurring pattern on the second non-linear side. In other words, the recurring patterns on both non-linear sides are in-phase. Due to this symmetry, less lateral stress is applied to each ribbon 402 within the fourth embodiment than to each ribbon 302 within the third embodiment. As a result, the fourth embodiment is more mechanically stable than the third embodiment. However, the fourth embodiment does not provide as high contrast as the third embodiment. As discussed above, higher contrast is achieved when the effective width of adjacent ribbons is equal. This is the case in the third embodiment. However, as can be seen in FIG. 8, the effective widths W1 and W2 of two adjacent ribbons 402 are not equal. Since W1 is not equal to W2, the contrast provided by the fourth embodiment is not as high as the contrast provided by the third embodiment.

PDL produced by the half-circle projections is less than the PDL produced by the square projections. This is because of the smoothly varying nature of the edge of the circle. The square is not smoothly varying at the corners, where there are abrupt changes in direction. Such abrupt changes lead to increases in PDL when compared to PDL produced at the smoothly varying edge of the circle. However, the more smoothly varying the non-linear side of the ribbon, the less distinct is the diffraction of the incident light. As such, for a smoothly varying non-linear side it is more difficult to de-couple the diffracted light from the reflected light in the zero order. Since all of the diffracted light can not be decoupled in this case, the contrast is reduced. This concept can be better understood by looking at the operation of the grating light valve™ light modulator.

In operation, the zero order light is collected. When in the reflection mode, virtually all of the incident light is reflected back as zero order light. In the diffraction mode, alternating ones of the ribbons are deflected to a maximum diffraction distance of a quarter wavelength $\lambda/4$ of the incident light. In an optimal case, virtually all of the incident light will diffract into the first order while in the diffraction mode. In practice, a portion of the incident light scatters. In other words, a portion of the incident light diffracts at an angle different than that of the first order. Some of the light that is scattered can be close enough to the zero order such that this scattered light is collected in addition to any zero order light. Non zero-order light may be collected because the portion of the scattered light close enough to the zero order can not be decoupled from the zero order light. As more of the scattered light is collected, contrast is reduced.

As the ribbons are deflected towards $\lambda/4$, the incident light reflected in the zero order is reduced and the diffracted light increases. For a non-linear side with a recurring pattern of square projections, the highest contrast is achieved at the maximum diffraction $\lambda/4$. This is because the square projections diffract a significant percentage of the incident light into the first order and less of the incident light is scattered elsewhere. However, half-circle projections diffract a lower percentage of the incident light into the first order and comparatively more light is scattered at an angle that can not be decoupled from the zero order. Therefore, as the ribbons are deflected and the zero order light is reduced, the diffracted light increases including the scattered light that can not be decoupled from the zero order light. There reaches a deflection point short of $\lambda/4$ where the amount of light that is collected can no longer be reduced. Even though the incident light reflected back as zero order light continues to decrease as the deflection of the ribbons increase, the amount of scattered light that is collected is simultaneously increasing. Therefore, the maximum contrast achieved by the half-circle projections is not as high as the maximum contrast achieved by the square projections. Recalling that PDL produced by the half-circle projections is less than the PDL produced by the square projections, there exists a trade-off between PDL and contrast.

PDL also varies with the distance that the ribbons are deflected. The more the ribbons are deflected, the more light is diffracted and the more PDL is introduced. When the ribbons are deflected, each polarization state TM and TE see an edge and a height. Preferably, any projection in the non-linear sides is constant through the entire thickness of the ribbon. In the case of the recurring patterns such as alternating half circles, squares, triangles and sinusoids, each polarization state TM and TE sees the same topology. Regardless of the orientation, each polarization state TM and TE sees the same edge and step, otherwise called 3-D topology. In the case of the recurring patterns such as alternating half circles, squares, triangles and sinusoids, the ribbon configuration is 3-D symmetric. This results in good PDL performance as a function of attenuation.

It should be clear to those skilled in the art that the half-circle projections illustrated in FIGS. 7 and 8 can include a radius either smaller or larger than that shown. For applications using diffraction, the radius of the half-circles must preferably be greater than or equal to the wavelength of the incident light.

Figure 9:
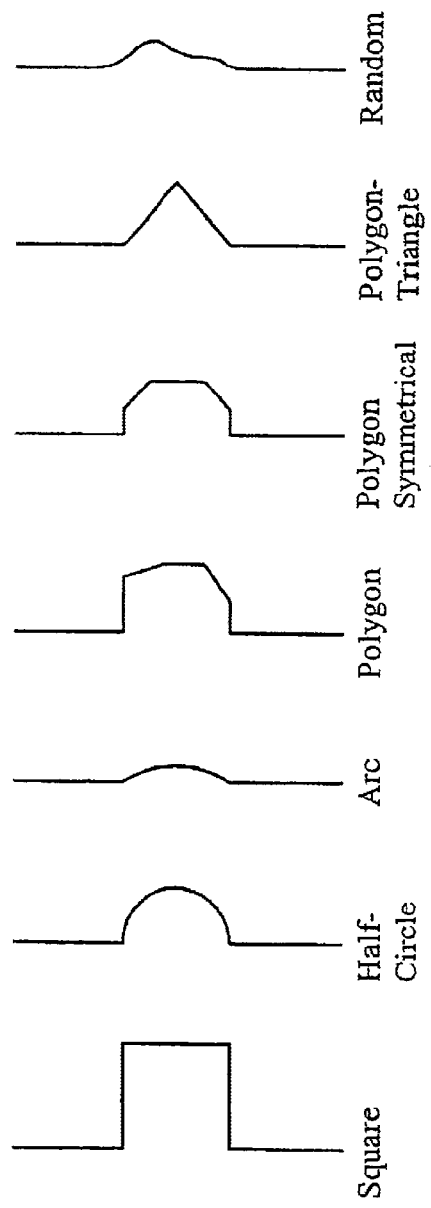
FIG. 9 illustrates examples of projection shapes that can be included on the non-linear sides of the elements.

It is understood that the embodiments illustrated in FIGS. 5–8 are intended to aid in understanding and should not be used to limit the scope of the present invention. The gap width g, the ribbon width W, the dimensions of the projections and the frequency of the projections illustrated in FIGS. 5–8 can be increased or decreased as appropriate. Furthermore, the shapes of the projections are not limited to squares and half-circles. FIG. 9 illustrates examples of projection shapes that can be included on the non-linear sides of the ribbons. Projection shapes can include, but are not limited to, a square, a half-circle, an arc, a polygon including a symmetrical polygon and a triangle, or any randomly shaped projection.

Figure 10:
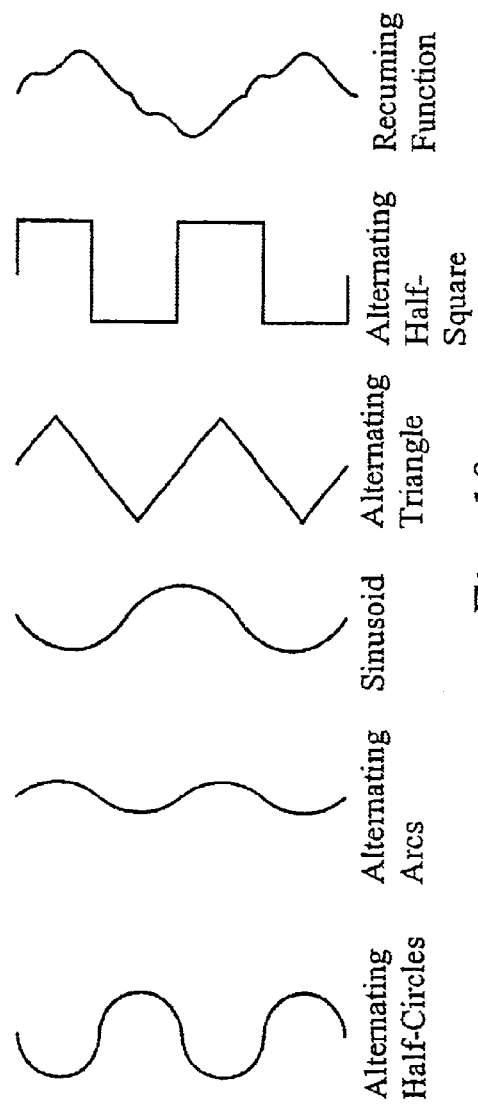
FIG. 10 illustrates examples of recurring patterns that can be included on the non-linear sides of the elements.

Similarly, the recurring patterns formed by the non-linear sides of the ribbons are not limited to alternating halves of a circle or alternating halves of a square. FIG. 10 illustrates examples of recurring patterns that can be included on the non-linear sides of the ribbons. Recurring patterns can include, but are not limited to, alternating half-circles, alternating arcs, a sinusoid, alternating triangles, alternating squares, or any other recurring function. Arcs can also be considered as sectors of a circle, where a recurring pattern that alternates between a sector of a circle and a mirror image of the sector has a decreased amplitude as compared to a recurring pattern that alternates half-circles of the circle.

It will be readily apparent to one skilled in the art that other various modifications may be made to the embodiments without departing from the spirit and scope of the invention as defined by the appended claims.

We claim:

1. A modulator for modulating an incident beam of light comprising:
   a. a plurality of elements, each element including a first end, a second end, a first non-linear side, a second non-linear side, and a light reflective planar surface with the light reflective planar surfaces of the plurality of elements lying in one or more parallel planes, wherein the elements are arranged parallel to each other; and
   b. a support structure coupled to each end of the plurality of elements to maintain a position of each element relative to each other and to enable movement of selective ones of the plurality of elements between a first modulator configuration wherein the plurality of elements act to reflect the incident beam of light as a plane mirror, and a second modulator configuration wherein the plurality of elements act to diffract the incident beam of light.

2. The modulator according to claim 1 wherein the first non-linear side and the second non-linear side each include one or more projections, wherein each projection is perpendicular to the light reflective planar surface.

3. The modulator according to claim 2 wherein a shape of each projection is constant along a thickness of the element.

4. The modulator according to claim 3 wherein the shape of the projection is an arc.

5. The modulator according to claim 3 wherein the shape of the projection is a polygon.

6. The modulator according to claim 3 wherein each projection on the first non-linear side is repeated according to a constant period, and each projection on the second non-linear side is repeated according to a constant period.

7. The modulator according to claim 6 wherein the period of the first non-linear side and the period of the second non-linear side are the same.

8. The modulator according to claim 6 wherein the shape of each projection is the same.

9. The modulator according to claim 8 wherein the projections on the first non-linear side are symmetric in relation to the projections on the second non-linear side.

10. The modulator according to claim 1 wherein the first non-linear side forms a recurring pattern and the second non-linear side forms a recurring pattern.

11. The modulator according to claim 10 wherein the recurring pattern on each side is the same.

12. The modulator according to claim 11 wherein the recurring pattern on the first non-linear side is symmetric in relation to the recurring pattern on the second non-linear side.

13. The modulator according to claim 10 wherein the recurring pattern is formed by alternating halves of a circle.

14. The modulator according to claim 10 wherein the recurring pattern is formed by alternating a sector of a circle and the mirror image of the sector.

15. The modulator according to claim 10 wherein the recurring pattern is a sinusoid.

16. The modulator according to claim 1 wherein the non-linear sides of adjacent elements are separated by a constant gap width.

17. The modulator according to claim 1 wherein the modulator is a diffractive MEMS device.

18. The modulator according to claim 1 wherein the selective ones of the elements are alternating elements and are moved by applying an electrostatic force.

19. A method of modulating an incident beam of light comprising:
   a. supporting each of a plurality of elements to maintain a position of each element relative to each other and to enable movement of selective ones of the plurality of elements, wherein each element includes a first end, a second end, a first non-linear side, a second non-linear side, and a light reflective planar surface with the light reflective planar surfaces of the plurality of elements lying in one or more parallel planes, and the elements are arranged parallel to each other; and
   b. moving selective ones of the plurality of elements between a first modulator configuration wherein the plurality of elements act to reflect the incident beam of light as a plane mirror, and a second modulator configuration wherein the plurality of elements act to diffract the incident beam of light.

20. A modulator for modulating an incident beam of light comprising:
   a. means for supporting each of a plurality of elements to maintain a position of each element relative to each other and to enable movement of selective ones of the plurality of elements, wherein each element includes a first end, a second end, a first non-linear side, a second non-linear side, and a light reflective planar surface with the light reflective planar surfaces of the plurality of elements lying in one or more parallel planes, and the elements are arranged parallel to each other; and
   b. means for moving selective ones of the plurality of elements between a first modulator configuration wherein the plurality of elements act to reflect the incident beam of light as a plane mirror, and a second modulator configuration wherein the plurality of elements act to diffract the incident beam of light.

* * * * *